US012811298B2

(12) United States Patent
Qu

(10) Patent No.: US 12,811,298 B2
(45) Date of Patent: Nov. 24, 2026

(54) GNSS ANTENNA

(71) Applicant: Shenzhen Ant SatCom Technology Co., Ltd., Shenzhen (CN)

(72) Inventor: Longyue Qu, Dalian (CN)

(73) Assignee: Shenzhen Ant SatCom Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/279,440

(22) Filed: Jul. 24, 2025

(65) Prior Publication Data

US 2025/0350031 A1 Nov. 13, 2025

Related U.S. Application Data

(63) Continuation-in-part of application No. PCT/CN2024/131970, filed on Nov. 14, 2024.

(30) Foreign Application Priority Data

Nov. 24, 2023 (CN) ......................... 202311583251.2

(51) Int. Cl.
*H01Q 9/04* (2006.01)
*H01Q 1/24* (2006.01)

(52) U.S. Cl.
CPC ........... *H01Q 9/0407* (2013.01); *H01Q 1/241* (2013.01)

(58) Field of Classification Search
CPC .... H01Q 9/0407; H01Q 1/241; H01Q 9/0435; H01Q 9/0442; H01Q 1/3233
See application file for complete search history.

(56) References Cited

U.S. PATENT DOCUMENTS 4,680,548 A * 7/1987 Edelstein ......... G01R 33/34076 324/318
5,767,810 A * 6/1998 Hagiwara ............ H01Q 9/0421 343/702

(Continued)

FOREIGN PATENT DOCUMENTS

CN 1435950 A * 8/2003 ............... H01Q 1/32
CN 110718750 A * 1/2020 ............. H01Q 5/328

(Continued)

OTHER PUBLICATIONS

International Search Report for PCT/CN2024/131970 issued by CNIPA (China National Intellectual Property Administration) on Feb. 17, 2025.

*Primary Examiner* — Dameon E Levi
*Assistant Examiner* — Jordan E. DeWitt
(74) *Attorney, Agent, or Firm* — AVEK IP, LLC

(57) ABSTRACT

Some embodiments of the disclosure provide a GNSS antenna. In some examples, the GNSS antenna includes a patch, a first capacitive element, a second capacitive element, a third capacitive element, a fourth capacitive element, a fifth capacitive element, a sixth capacitive element, a seventh capacitive element, an eighth capacitive element, a connecting conductor, and a ground plate. In some examples, the ground plate is arranged under the patch; the patch, the capacitive elements, the connecting conductor, and the ground plate are electrically connected to form a first loop-type current resonator, a second loop-type current resonator, a third loop-type current resonator, and a fourth loop-type current resonator, respectively, the first loop-type current resonator, the second loop-type current resonator, the third loop-type current resonator, and the fourth loop-type current resonator are sequentially arranged in a crosswise manner.

12 Claims, 12 Drawing Sheets

(56) References Cited

U.S. PATENT DOCUMENTS

| | | | | | |
|---|---|---|---|---|---|
| 5,917,450 | A * | 6/1999 | Tsunekawa | H01Q 9/0414 | 343/700 MS |
| 6,369,761 | B1 * | 4/2002 | Thiam | H01Q 9/0421 | 343/702 |
| 7,333,060 | B2 * | 2/2008 | Ando | H01Q 9/0414 | 343/846 |
| 8,783,577 | B2 * | 7/2014 | Suzuki | H01Q 23/00 | 235/492 |
| 10,177,454 | B1 * | 1/2019 | Patel | H01Q 5/335 | |
| 11,239,556 | B2 * | 2/2022 | Martel | H01Q 9/0421 | |
| 12,620,713 | B2 * | 5/2026 | Takayama | H01Q 1/38 | |
| 2003/0210193 | A1 * | 11/2003 | Rossman | H01Q 9/0464 | 343/700 MS |
| 2004/0090389 | A1 * | 5/2004 | Jo | H01Q 21/26 | 343/797 |
| 2012/0050120 | A1 * | 3/2012 | Lindenmeier | H01Q 1/3275 | 343/732 |
| 2012/0268347 | A1 * | 10/2012 | Tatarnikov | H01Q 13/106 | 343/893 |
| 2015/0123869 | A1 * | 5/2015 | Bit-Babik | H01Q 21/065 | 29/600 |
| 2015/0253398 | A1 * | 9/2015 | Ferrand | G01R 33/3628 | 324/322 |
| 2015/0357720 | A1 * | 12/2015 | Chen | H01Q 21/28 | 343/727 |
| 2018/0166773 | A1 * | 6/2018 | Tatarnikov | H01Q 1/3275 | |
| 2019/0103676 | A1 * | 4/2019 | Sugimoto | H01Q 1/42 | |
| 2022/0278456 | A1 * | 9/2022 | Wang | H01Q 9/0457 | |
| 2024/0106124 | A1 * | 3/2024 | Niroo Jazi | H01Q 9/0442 | |
| 2024/0162617 | A1 * | 5/2024 | Batra | H01Q 9/0435 | |
| 2024/0275008 | A1 * | 8/2024 | Fang | H01P 1/18 | |
| 2024/0275070 | A1 * | 8/2024 | Bastin | H01Q 15/006 | |
| 2024/0426889 | A1 * | 12/2024 | Jiang | G01R 29/10 | |
| 2025/0158270 | A1 * | 5/2025 | Lima | H01Q 9/0421 | |
| 2026/0237888 | A1 * | 8/2026 | Lindenmeier | G01S 3/20 | |

FOREIGN PATENT DOCUMENTS

| | | | | | |
|---|---|---|---|---|---|
| CN | 111082226 | A | * | 4/2020 | H01Q 9/0428 |
| CN | 117748138 | A | * | 3/2024 | H01Q 9/0442 |
| DE | 4002899 | A1 | * | 8/1991 | H01Q 9/0464 |

* cited by examiner

GNSS ANTENNA

CROSS REFERENCE TO RELATED APPLICATIONS

This application is a continuation-in-part of International Application No. PCT/CN2024/131970, filed on Nov. 14, 2024, which claims priority to Chinese Patent Application No. 202311583251.2, filed on Nov. 24, 2023. Both of the aforementioned applications are hereby incorporated by reference in their entireties.

FIELD OF THE DISCLOSURE

The present disclosure relates to the technical field of antennas, in particular to a GNSS (Global Navigation Satellite System) antenna.

BACKGROUND

Patch antenna is widely deployed in many devices due to its small size and light weight, such as a global positioning system receiver, vehicle communication, and satellite communication. Basic elements of a conventional patch antenna are a flat patch and a ground plate separated by a dielectric medium. This type of patch antenna, also known as a microstrip antenna, may be fabricated by a photolithography process, such as a process for fabricating a printed circuit board (PCB). These fabrication processes may achieve economic and batch production. In a common design of the microstrip antenna, the ground plate and a radiation patch are made of metal films deposited or electroplated on a dielectric substrate. A length of the microstrip patch is about half a wavelength of electromagnetic waves propagated in the dielectric substrate. By using the dielectric medium with a high dielectric constant, the length of the microstrip patch may be effectively reduced to achieve miniaturization of the antenna, such as a ceramic patch antenna, as shown in FIG. 1A and FIG. 1B.

However, the existing miniaturization technology has defects as follows: limited frequency modulation capability, heavy weight, low gain, and narrow bandwidth. In radio frequency and microwave frequency bands, the dielectric substrate with a high dielectric constant also has high density, which leads to an increase in the weight of the antenna. A lightweight antenna may effectively reduce the weight of a device and improve the endurance of the device, and has important strategic significance, especially in the field of unmanned aerial vehicles (UAV). In addition, for a GNSS antenna, high gain and circularly polarized signals are two important parameters, which may effectively reduce multipath fading and environmental interference, and improve communication quality and positioning accuracy. Therefore, it is necessary to provide a miniaturized, lightweight, ceramic-free, high-gain, and high-performance patch antenna to meet the growing demand for communication and high-accuracy positioning.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a GNSS antenna which includes: a patch; a first capacitive element, a second capacitive element, a third capacitive element, a fourth capacitive element, a fifth capacitive element, a sixth capacitive element, a seventh capacitive element, an eighth capacitive element; a connecting conductor; and a ground plate, arranged below the patch.

The connecting conductor is configured to expand and connect the capacitive elements to achieve an electrical connection between the patch and the ground plate.

The patch, the first capacitive element, the fifth capacitive element, the connecting conductor, and the ground plate are electrically connected to form a first loop-type current resonator. The patch, the second capacitive element, the sixth capacitive element, the connecting conductor, and the ground plate are electrically connected to form a second loop-type current resonator. The patch, the third capacitive element, the seventh capacitive element, the connecting conductor, and the ground plate are electrically connected to form a third loop-type current resonator. The patch, the fourth capacitive element, the eighth capacitive element, the connecting conductor, and the ground plate are electrically connected to form a fourth loop-type current resonator.

The first loop-type current resonator, the second loop-type current resonator, the third loop-type resonator, and the fourth loop-type current resonator are arranged crosswise in turn.

With reference to the GNSS antenna of the present disclosure, in a first possible implementation, the high-performance GNSS antenna further includes: a feed line, configured to feed an RF signal.

The first capacitive element, the second capacitive element, the third capacitive element, the fourth capacitive element, the fifth capacitive element, the sixth capacitive element, the seventh capacitive element, and the eighth capacitive element are electrically connected to a first position, a second position, a third position, a fourth position, a fifth position, a sixth position, a seventh position, and an eighth position of sides of the patch, respectively.

With reference to the first possible implementation of the present disclosure, in a second possible implementation, the patch is a rectangular patch, the first position, the third position, the fifth position, and the seventh position are a first corner, a second corner, a third corner, and a fourth corner of the rectangular patch, respectively; the second position, the fourth position, the sixth position, and the eighth position are a first midpoint between the first corner and the second corner, a second midpoint between the second corner and the third corner, a third midpoint between the third corner and the fourth corner, and a fourth midpoint between the fourth corner and the first corner, respectively.

With reference to the first possible implementation of the present disclosure, in a third possible implementation, the patch is an elliptical patch, a circular patch, or a ring patch. The first position, the second position, the third position, the fourth position, the fifth position, the sixth position, the seventh position, and the eighth position are a first equal-division point, a second equal-division point, a third equal-division point, a fourth equal-division point, a fifth equal-division point, a sixth equal-division point, a seventh equal-division point, and an eighth equal-division point on a circumference of the patch, respectively.

With reference to the second or third possible implementation of the present disclosure, in a fourth possible implementation, the connecting conductor includes: a first metal connection wire, a second metal connection wire, a third metal connection wire, a fourth metal connection wire, a fifth metal connection wire, a sixth metal connection wire, a seventh metal connection wire, and an eighth metal connection wire.

The first metal connection wire, the second metal connection wire, the third metal connection wire, the fourth metal connection wire, the fifth metal connection wire, the sixth metal connection wire, the seventh metal connection wire, and the eighth metal connection wire are connected between the first capacitive element and the ground plate, between the second capacitive element and the ground plate, between the third capacitive element and the ground plate, between the fourth capacitive element and the ground plate, between the fifth capacitive element and the ground plate, between the sixth capacitive element and the ground plate, between the seventh capacitive element and the ground plate, and between the eighth capacitive element and the ground plate, respectively.

With reference to the second or third possible implementation of the present disclosure, in a fifth possible implementation, the connecting conductor is a metal block.

A shape of the metal block is designed to adapt to a shape of the patch.

A bottom surface of the metal block is electrically connected to the ground plate, and corresponding positions of a top surface of the metal block are electrically connected to the first capacitive element, the second capacitive element, the third capacitive element, the fourth capacitive element, the fifth capacitive element, the sixth capacitive element, the seventh capacitive element, and the eighth capacitive element, respectively.

With reference to the fourth possible implementation of the present disclosure, in a sixth possible implementation, the patch is arranged above the ground plate in parallel. The first metal connection wire, the second metal connection wire, the third metal connection wire, the fourth metal connection wire, the fifth metal connection wire, the sixth metal connection wire, the seventh metal connection wire, and the eighth metal connection wire are perpendicularly arranged between the patch and the ground plate, respectively.

With reference to the fifth possible implementation of the present disclosure, in a seventh possible implementation, the patch, the metal block, and the ground plate are sequentially arranged from top to bottom in parallel, and the bottom surface of the metal block is attached to the ground plate.

With reference to the GNSS antenna of the present disclosure, in an eighth possible implementation, the first capacitive element and the fifth capacitive element are symmetrically arranged, the second capacitive element and the sixth capacitive element are symmetrically arranged, the third capacitive element and the seventh capacitive element are symmetrically arranged, and the fourth capacitive element and the eighth capacitive element are symmetrically arranged. The formed first loop-type current resonator and third loop-type current resonator are orthogonal to each other, and the formed second loop-type current resonator and fourth loop-type current resonator are orthogonal to each other.

With reference to the GNSS antenna of the present disclosure, in a ninth possible implementation, the GNSS antenna further includes: a first dielectric substrate; and a second dielectric substrate.

The second dielectric substrate is arranged above the first dielectric substrate in parallel; and the first dielectric substrate is used for printing the ground plate, and the second dielectric substrate is used for printing the patch.

The first capacitive element, the second capacitive element, the third capacitive element, the fourth capacitive element, the fifth capacitive element, the sixth capacitive element, the seventh capacitive element, and the eighth capacitive element are soldered to corresponding positions of the second dielectric substrate by a surface mounting technology (SMT).

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION

Figure 1A:
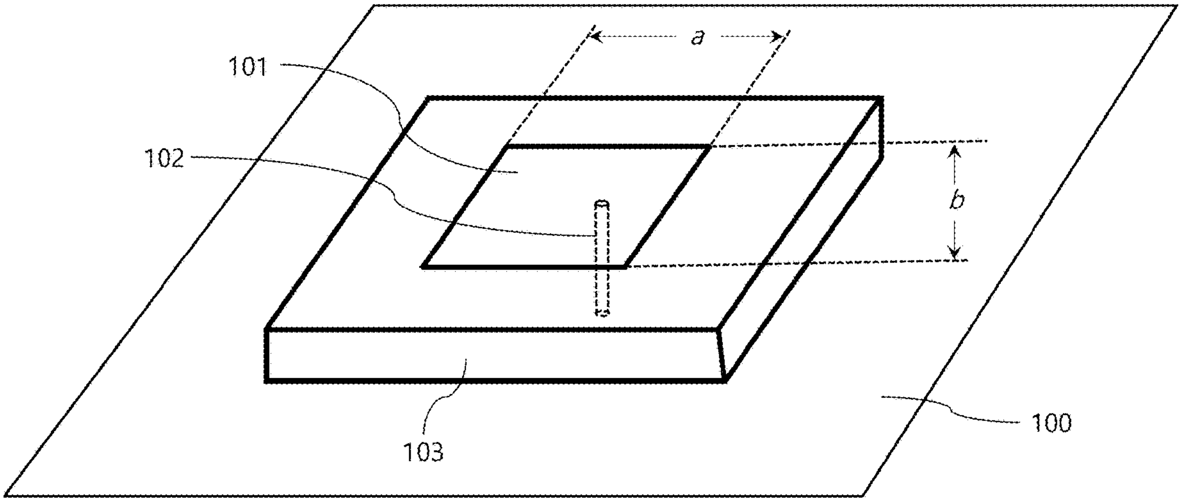
(PRIOR ART) FIG. 1A
FIG. 1A is a diagram of a three-dimensional structure of a conventional ceramic patch antenna.

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Unless otherwise defined, all technical and scientific terms used herein have the same meaning as commonly understood by those skilled in the art of the present disclosure. The terms used in the specification of the present disclosure herein are merely for the purpose of describing specific embodiments and are not intended to limit the present disclosure. The term "and/or" used herein includes any and all possible combinations of one or more of the associated listed items.

It should be noted that when an element is said to be "fixed" or "disposed" on another element, it may be directly or indirectly on another element. When an element is said to be "connected" to another element, it may be directly or indirectly connected to another element.

It should be understood that an orientation or positional relationship indicated by terms "length", "width", "upper", "lower", "front", "back", "left", "right", "vertical", "horizontal", "top", "bottom", "inside" and "outside" is based on the orientation or positional relationship shown in the drawings only for convenience of description of the present disclosure and simplification of description rather than indicating or implying that the apparatus or element referred to must have a particular orientation, be constructed and operate in a particular orientation, and thus are not to be construed as limiting the present disclosure.

Furthermore, the terms "first" and "second" are used for descriptive purposes only and are not to be construed as indicating or implying relative importance or implying the number of the indicated technical features. As such, the feature defined by "first" and "second" may explicitly or implicitly include one or more features. In the description of the present disclosure, "a plurality of" means two or more, unless otherwise specifically defined.

Figure 1B:
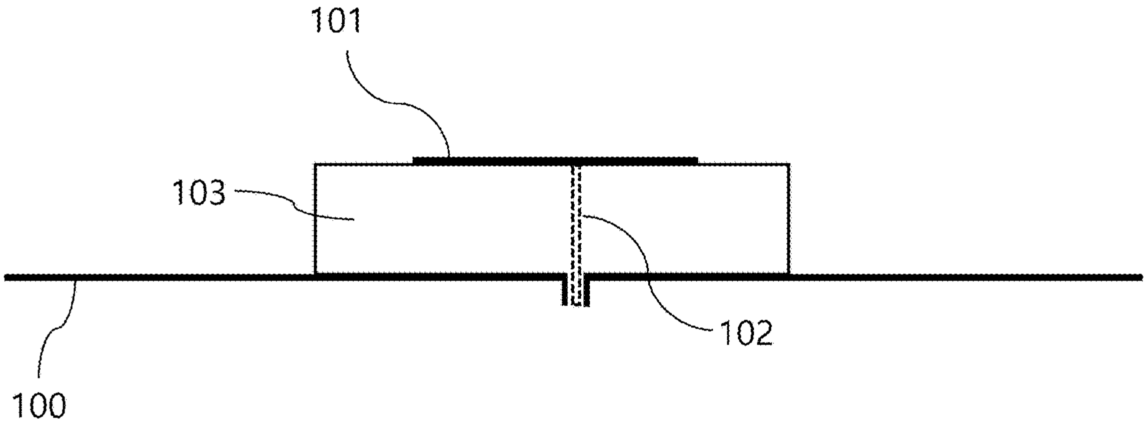
(PRIOR ART) FIG. 1B
FIG. 1B is a diagram of a sectional structure of the conventional ceramic patch antenna.

The existing ceramic patch antenna is limited in antenna frequency tunability, large in weight, and low in gain, as shown in FIG. 1A and FIG. 1B.

For the foregoing problems, a GNSS antenna is provided to solve the problems described above.

Embodiment 1

Figure 2A:
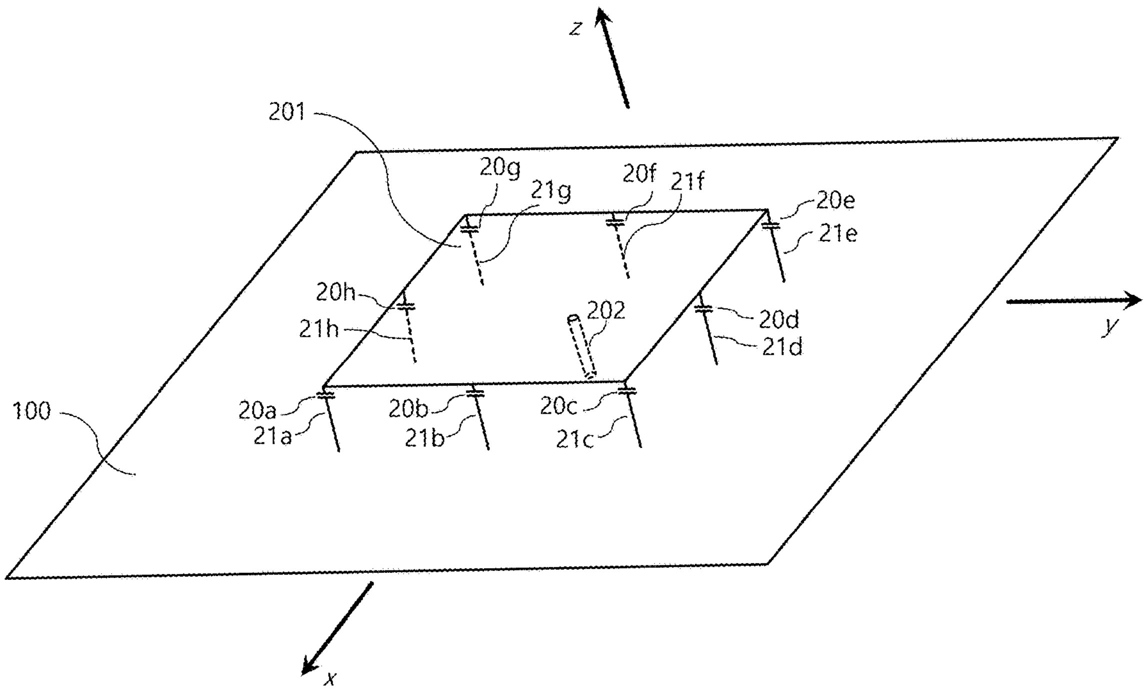
FIG. 2A is a diagram of a first three-dimensional structure of a high-performance GNSS antenna according to embodiment 1 of the present disclosure.
Figure 2B:
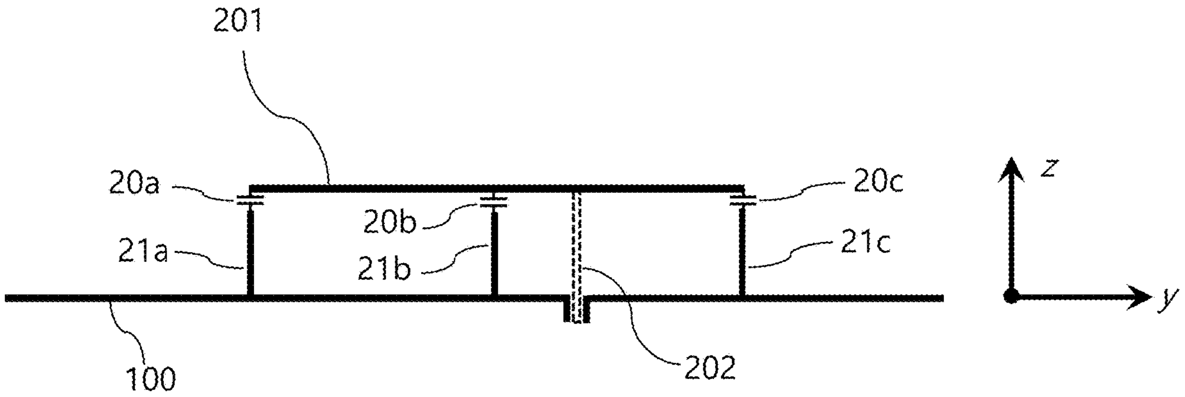
FIG. 2B is a side view of the high-performance GNSS antenna according to embodiment 1 of the present disclosure in a yz plane.

As shown in FIG. 2A and FIG. 2B, FIG. 2A is a diagram of a first three-dimensional structure of a high-performance GNSS antenna according to embodiment 1 of the present disclosure, and FIG. 2B is a side view of the high-performance GNSS antenna according to embodiment 1 of the present disclosure in a yz plane. The GNSS antenna may include a patch 201 (for radiating and receiving a signal), a first capacitive element 20*a*, a second capacitive element 20*b*, a third capacitive element 20*c*, a fourth capacitive element 20*d*, a fifth capacitive element 20*e*, a sixth capacitive element 20*f*, a seventh capacitive element 20*g*, an eighth capacitive element 20*h*, a connecting conductor (for electrically connecting the patch and a ground plate), and a ground plate 100. The ground plate 100 is arranged below the patch 201 to provide an electrical connection and support. The first capacitive element 20*a*, the second capacitive element 20*b*, the third capacitive element 20*c*, the fourth capacitive element 20*d*, the fifth capacitive element 20*e*, the sixth capacitive element 20*f*, the seventh capacitive element 20*g*, and the eighth capacitive element 20*h* are electrically connected at a first position, a second position, a third position, a fourth position, a fifth position, a sixth position, a seventh position, and an eighth position of sides of the patch and the connecting conductor, respectively, and are electrically connected to the ground plate 100 through the connecting conductor, respectively. The patch 201, the first capacitive element 20*a*, the fifth capacitive element 20*e*, the connecting conductor, and the ground plate 100 are electrically connected to form a first loop-type current resonator. The patch 201, the second capacitive element 20*b*, the sixth capacitive element 20*f*, the connecting conductor, and the ground plate 100 are electrically connected to form a second loop-type current resonator. The patch 201, the third capacitive element 20*c*, the seventh capacitive element 20*g*, the connecting conductor, and the ground plate 100 are electrically connected to form a third loop-type current resonator. The patch 201, the fourth capacitive element 20*d*, the eighth capacitive element 20*h*, the connecting conductor, and the ground plate are electrically connected to form a fourth loop-type current resonator. The first loop-type current resonator, the second loop-type current resonator, the third loop-type current resonator, and the fourth loop-type current resonator are arranged crosswise in turn.

Further, the high-performance GNSS antenna may include a feed line, and two ends of the feed line are electrically connected to the patch and the ground plate 100, respectively.

The feed line 202 is a probe feed or a coaxial feed line, an inner conductor and an outer conductor of the coaxial feed line are connected to the patch 201 and the ground plate 100, respectively, to feed an RF signal. Other common feed methods may also be used, such as coupling feed. There is no need for a high-dielectric-constant material between the rectangular patch 201 and the ground plate 100, for example, it may be an air medium.

In some implementations, two feed lines may be used for differential feeding.

Figure 5A:
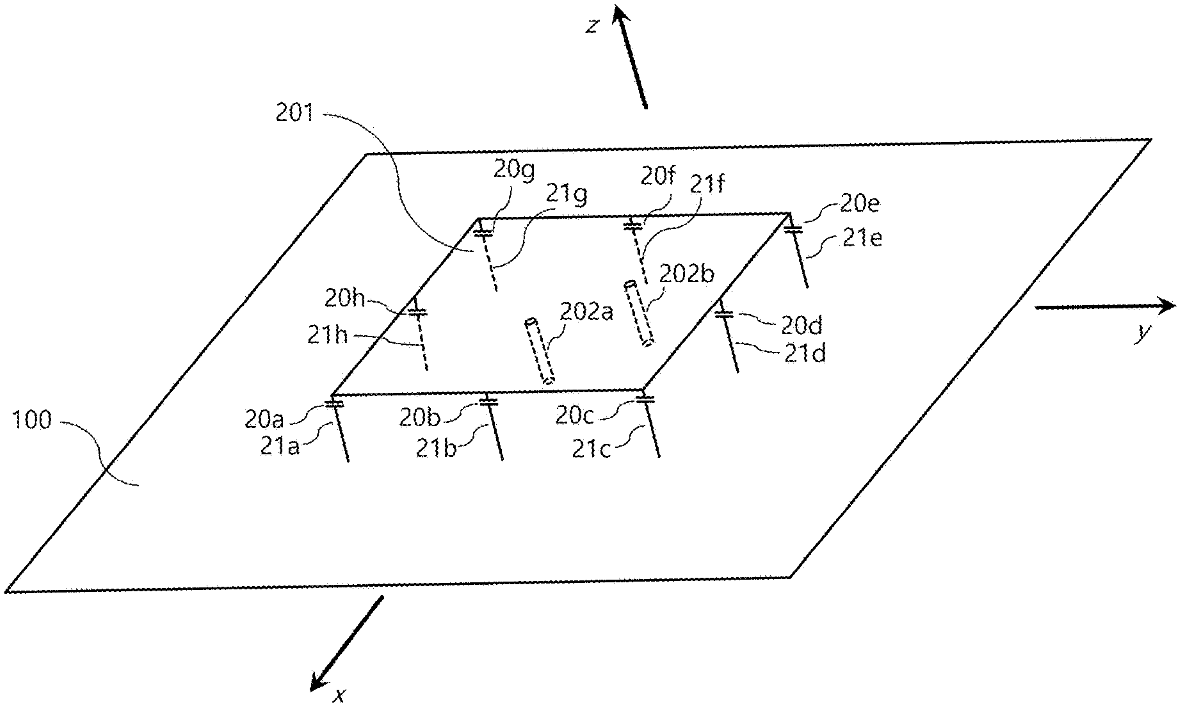
FIG. 5A is a diagram of a third three-dimensional structure of the high-performance GNSS antenna according to embodiment 1 of the present disclosure.
Figure 5B:
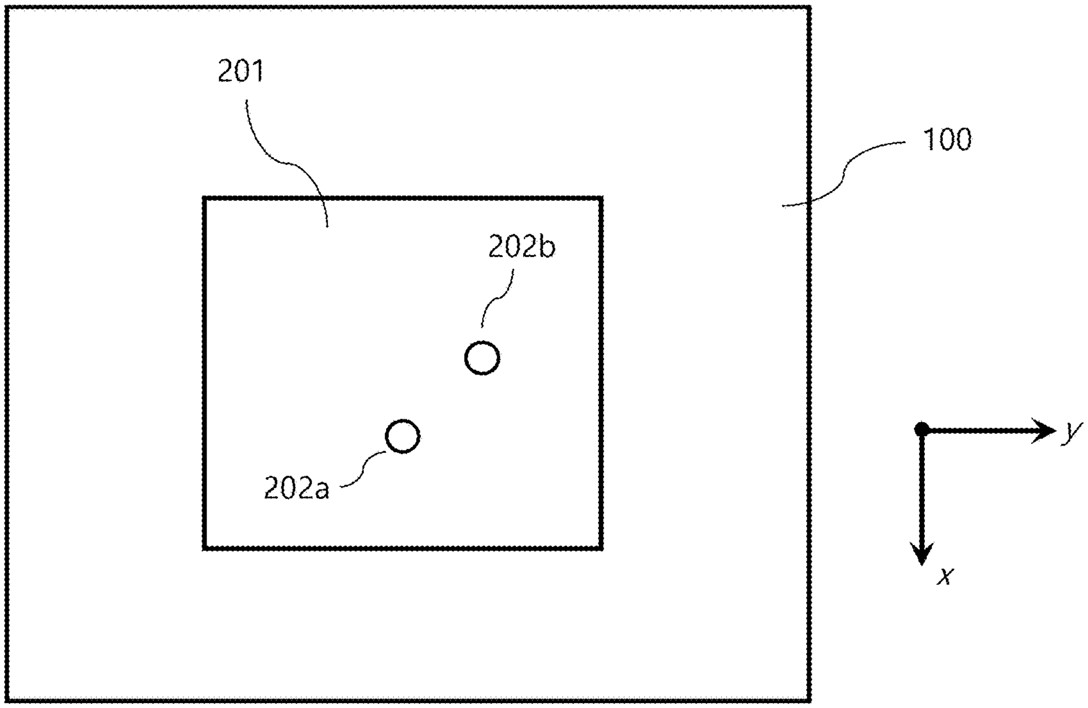
FIG. 5B is a top view of the high-performance GNSS antenna according to embodiment 1 of the present disclosure.

As shown in FIG. 5A and FIG. 5B, FIG. 5A is a diagram of a third three-dimensional structure of the high-performance GNSS antenna according to embodiment 1 of the present disclosure, and FIG. 5B is a top view of the high-performance GNSS antenna according to embodiment 1 of the present disclosure. A feed line 202*a* and a feed line 202*b* are either a probe feed line or a coaxial feed line. An inner conductor and an outer conductor of the coaxial feed line are connected to the patch 201 and the ground plate 100, respectively, to feed the RF signal.

The feed line 202*a* is arranged in an x-axis direction, the feed line 202*b* is arranged in a y-axis direction, which are in an orthogonal state. Meanwhile, the feed line 202$a$ and the feed line 202$b$ are configured to respectively feed two differential signals with equal amplitude and a 90-degree phase difference, which are configured to generate broadband circularly polarized signals and improve stability and positioning accuracy of the signals. In some implementations, four feed lines may also be used for differential feeding.

Figure 2C:
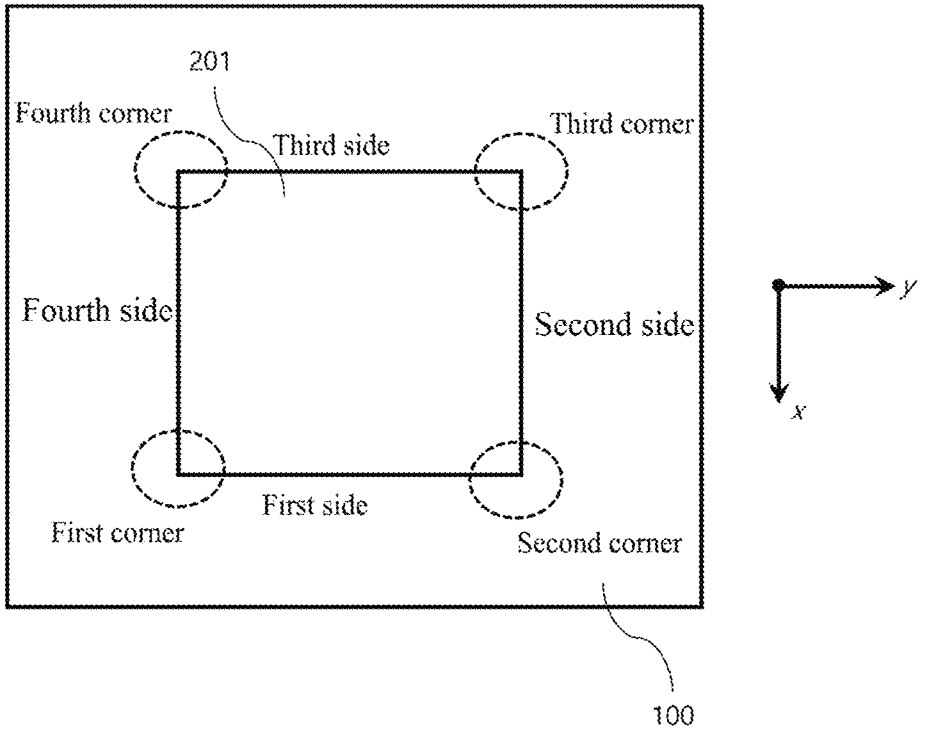
FIG. 2C is a diagram of a position of a rectangular patch according to embodiment 1 of the present disclosure.

In this embodiment, as shown in FIG. 2C, FIG. 2C is a diagram of a position of a rectangular patch according to embodiment 1 of the present disclosure. The patch is optionally a rectangular patch 201. The first position, the third position, the fifth position, and the seventh position are a first corner, a second corner, a third corner, and a fourth corner of the rectangular patch 201, respectively. The second position, the fourth position, the sixth position, and the eighth position are a first midpoint between the first corner and the second corner, a second midpoint between the second corner and the third corner, a third midpoint between the third corner and the fourth corner, and a fourth midpoint between the fourth corner and the first corner, respectively.

Further, the connecting conductor may include a first metal connection wire 21$a$, a second metal connection wire 21$b$, a third metal connection wire 21$c$, a fourth metal connection wire 21$d$, a fifth metal connection wire 21$e$, a sixth metal connection wire 21$f$, a seventh metal connection wire 21$g$, and an eighth metal connection wire 21$h$. The first metal connection wire 21$a$, the second metal connection wire 21$b$, the third metal connection wire 21$c$, the fourth metal connection wire 21$d$, the fifth metal connection wire 21$e$, the sixth metal connection wire 21$f$, the seventh metal connection wire 21$g$, and the eighth metal connection wire 21$h$ are connected between the first capacitive element 20$a$ and the ground plate 100, between the second capacitive element 20$b$ and the ground plate 100, between the third capacitive element 20$c$ and the ground plate 100, between the fourth capacitive element 20$d$ and the ground plate 100, between the fifth capacitive element 20$e$ and the ground plate 100, between the sixth capacitive element 20$f$ and the ground plate 100, between the seventh capacitive element 20$g$ and the ground plate 100, and between the eighth capacitive element 20$h$ and the ground plate 100, respectively.

When the connecting conductor is implemented by using the metal connection wire, the patch 201 is arranged above the ground plate 100 in parallel, the first metal connection wire 21$a$, the second metal connection wire 21$b$, the third metal connection wire 21$c$, the fourth metal connection wire 21$d$, the fifth metal connection wire 21$e$, the sixth metal connection wire 21$f$, the seventh metal connection wire 21$g$, and the eighth metal connection wire 21$h$ are perpendicularly arranged between the patch 201 and the ground plate 100, respectively.

When the metal connection wire is used, a connection relationship between the patch, the capacitive element, and the metal connection wire is as follows: one end of the capacitive element at a corner/midpoint position is connected to the rectangular patch 201, the other end of the capacitive element is connected to the metal connection wire, and a lower end of the metal connection wire is connected to the ground plate 100 to play a role in electrically connecting the capacitive element and the ground plate 100. The metal connection wire is located between the rectangular patch 201 and the ground plate 100, which may be in the form of a wire, a metal sheet, and the like. The metal connection wire is configured to expand and connect the capacitive elements to achieve an electrical connection between the rectangular patch 201 and the ground plate 100. The capacitive element is a capacitive load between the rectangular patch 201 and the ground plate 100, which may effectively reduce an operating frequency of the patch antenna and implement the miniaturization of the antenna. Optionally, the metal connection wire is perpendicular to each of the patch 201 and the ground plate 100.

When the metal connection wire is used, the capacitive element may be connected: between the patch and the metal connection wire, in the middle of the metal connection wire, as well as between the metal connection wire and the ground plate.

When the metal block 400 is used, a connection relationship between the patch 201, the capacitive element, and the metal block 400 is as follows: one end of the capacitive element at a corner/midpoint position is connected to the rectangular patch 201, the other end of the capacitive element is connected to the metal block 400, and the metal block 400 is connected to the ground plate 100 to play a role in electrically connecting the capacitive element and the ground plate 100. The metal block 400 is located between the rectangular patch 201 and the ground plate 100. The metal block 400 is configured to expand and connect the capacitive elements to achieve an electrical connection between the rectangular patch 201 and the ground plate 100. The capacitive element is a capacitive load between the rectangular patch 201 and the ground plate 100, which may effectively reduce an operating frequency of the patch antenna and implement the miniaturization of the antenna. Optionally, the metal block 400 is perpendicular to each of the patch 201 and the ground plate 100. In addition, the connecting conductor is not limited to the metal connection wire or the metal block, which may be any other conductive structures. These conductive structures may include, but are not limited to, a conductive film, a conductive coating, or other materials or components with a conductive function, thereby meeting different design demands and adapting to various manufacturing processes.

In an optional implementation, the first capacitive element and the fifth capacitive element are symmetrically arranged, the second capacitive element and the sixth capacitive element are symmetrically arranged, the third capacitive element and the seventh capacitive element are symmetrically arranged, and the fourth capacitive element and the eighth capacitive element are symmetrically arranged. The formed first loop-type current resonator and third loop-type current resonator are orthogonal to each other, and the formed second loop-type current resonator and fourth loop-type current resonator are orthogonal to each other.

Figure 3A:
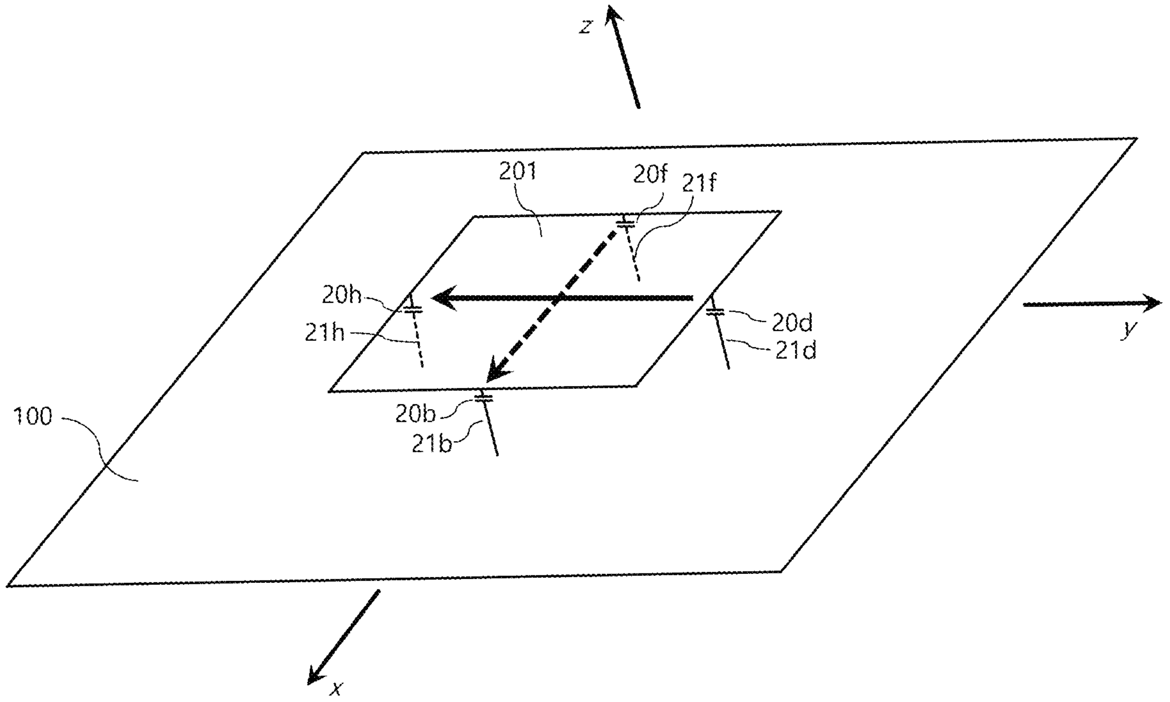
FIG. 3A and FIG. 3B are schematic diagrams of the principle of the high-performance GNSS antenna according to embodiment 1 of the present disclosure.
Figure 3B:
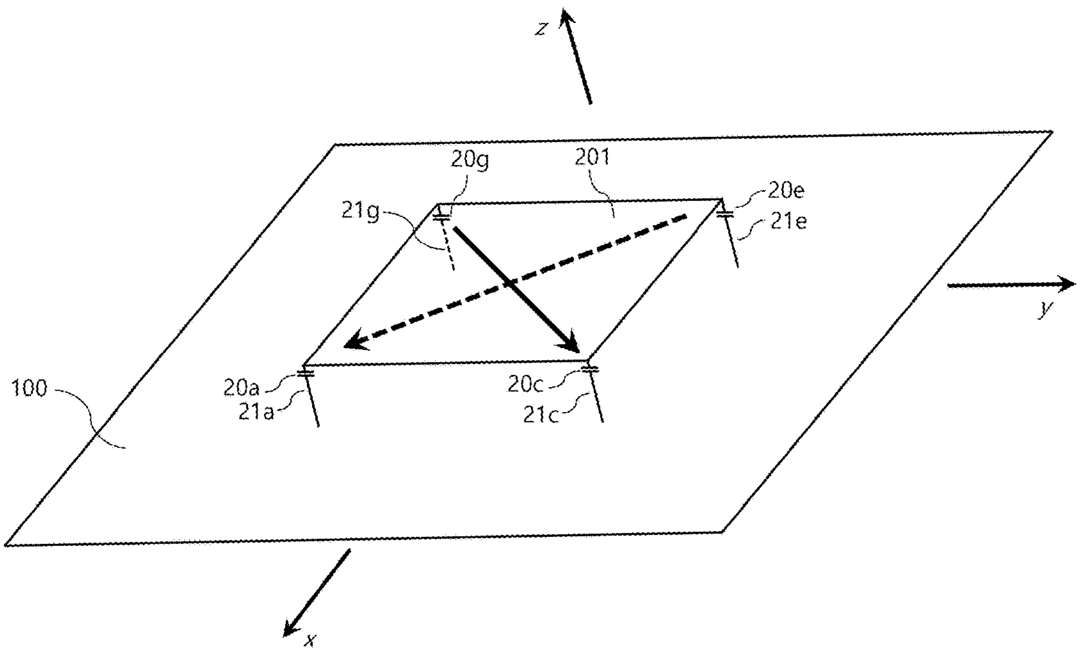

As shown in FIG. 3A and FIG. 3B, FIG. 3A and FIG. 3B are schematic diagrams of the principle of the high-performance GNSS antenna according to embodiment 1 of the present disclosure under a single feeding. The second capacitive element 20$b$, the second metal connection wire 21$b$, the sixth capacitive element 20$f$, the sixth metal connection wire 21$f$, the rectangular patch 201, and the ground plate 100 form the second loop-type current resonator. The current resonator generates a transverse current mode and an electric field Ex (as shown by a dotted arrow in the figure) in an x-axis direction. In addition, the operating frequency of the current resonator may be controlled by the second capacitive element 20$b$ and the sixth capacitive element 20$f$, where the operating frequency is f1. The fourth capacitive element 20$d$, the fourth metal connection wire 21$d$, the eighth capacitive element 20$h$, the eighth metal connection wire 21$h$, the rectangular patch 201, and the ground plate 100 form the fourth loop-type current resonator. The resonator generates a longitudinal current mode and an electric field Ey (as shown by a solid arrow in the figure) in a y-axis direction. In addition, the operating frequency of the resonator may be controlled by the fourth capacitive element 20*d* and the eighth capacitive element 20*h*, where the operating frequency is f2.

The two foregoing resonators may generate electric field components (Ex and Ey) with orthogonal characteristics, and a 90-degree phase difference may be generated at a central frequency (f0) by controlling a frequency difference between the two resonators (a frequency difference between f1 and f2). That is, the second loop-type current resonator and the fourth loop-type current resonator have orthogonal characteristics (that is, an included angle between the second loop-type current resonator and the fourth loop-type current resonator is about 80-100 degrees, which may be 80 degrees, 85 degrees, 90 degrees, 95 degrees, 100 degrees, and the like). Therefore, the GNSS antenna in the present disclosure may effectively control the magnitude and phase of the orthogonal electric fields to generate a circularly polarized signal. For example of a single-feed antenna in L1 frequency band, f0 is 1.575 GHz, f1 and f2 are typically tuned to either side of f0.

As shown in FIG. 3B, the first capacitive element 20*a*, the first metal connection wire 21*a*, the fifth capacitive element 20*e*, the fifth metal connection wire 21*e*, the rectangular patch 201, and the ground plate 100 form the first loop-type current resonator (a current direction of the first loop-type current resonator is as shown by a dotted arrow in the figure). The operating frequency of the resonator may be controlled by the first capacitive element 20*a* and the fifth capacitive element 20*e*, where the operating frequency is f1. The third capacitive element 20*c*, the third metal connection wire 21*c*, the seventh capacitive element 20*g*, the seventh metal connection wire 21*g*, the rectangular patch 201, and the ground plate 100 form the third loop-type current resonator (a current direction of the third loop-type current resonator is as shown by a solid arrow in the figure). The operating frequency of the resonator may be controlled by the third capacitive element 20*c* and the seventh capacitive element 20*g*, where the operating frequency is f2. Similarly, the two foregoing resonators also have orthogonal characteristics (that is, an included angle between the first loop-type current resonator and the third loop-type current resonator is about 80-100 degrees, which may be 80 degrees, 85 degrees, 90 degrees, 95 degrees, 100 degrees, and the like), and the magnitude and phase of the orthogonal electric fields may be controlled to generate a circularly polarized signal.

The GNSS antenna in this embodiment establishes four loop-type current resonators by using the capacitive elements. It should be noted that the included angle between the first loop-type current resonator and the third loop-type current resonator is about 80-100 degrees, and the included angle between the second loop-type current resonator and the fourth loop-type current resonator is about 80-100 degrees. In addition, it is required that an included angle between any two adjacent loop-type current resonators is about 40-50 degrees, which may be 40 degrees, 42 degrees, 45 degrees, 48 degrees, 50 degrees, and the like. The cross-symmetrical arrangement of the four loop-type current resonators on the patch, combined with the optimized included angle design, enables more uniform current excitation on the patch, eliminating the localized current concentration commonly observed in conventional designs. Such a structure boosts the current filling ratio on the patch surface and maximizes the radiation aperture utilization, thus enhancing the overall radiation capacity and directivity consistency. The resonator arrangement and included angle range obtained through simulation optimization may ensure an effect of enhancing the circularly polarized signals while producing orthogonal current modes, thus achieving the filling of the signal nulls and compensating for signal nonuniform. In summary, such a structural design not only improves the antenna's aperture efficiency but also raises the overall radiation gain by nearly 3 dB without increasing the size, effectively integrating miniaturization with high performance.

The capacitive element has capacitive composition, which may be a lumped element, such as a chip capacitor, a variable capacitor, an electrolytic capacitor, a ceramic capacitor, a thin film capacitor, and the like, or a distributed element, such as parallel wires (two or more wires which are arranged in parallel, where an electric field is generated between the wires to form capacitance, and a capacitance value is regulated by adjusting a wire-to-wire spacing and a wire length), a transmission line structure (such as a microstrip line or a coaxial cable), a capacitive flat plate (two parallel metal plates are separated by a dielectric layer or an air gap to form capacitance), a planar capacitive structure (a metal pattern printed on a PCB, such as finger or staggered structure, where a geometric shape is adjusted to optimize capacitance characteristics). These forms may be flexibly combined according to design demands to optimize the antenna performance. In addition, the capacitive element may be composed of a single capacitance element, or multiple elements connected to one another. To obtain a specific capacitance, a combination of multiple elements may be used to replace the capacitance element, for example, the capacitive element may be replaced by a combined structure of the capacitance element and an inductive element. The inductive element has inductive composition, which may be a lumped element, such as a chip inductor and a chip resistor, or a distributed element, such as a wire and a coil. In addition, the inductive element may be composed of a single inductive element, or multiple inductive elements connected to one another.

As may be known, when the capacitive element of the GNSS antenna of the present disclosure is implemented by using the lumped element, the antenna frequency may be effectively controlled by adjusting a capacitance value of the lumped element, with adjustability. When the capacitive element of the GNSS antenna of the present disclosure is implemented by using the distributed element, there is no need to add additional components, which not only saves the cost but also reduces the loss caused by components and further improves the antenna performance. Therefore, the GNSS antenna in the present disclosure has higher flexibility.

Figure 4A:
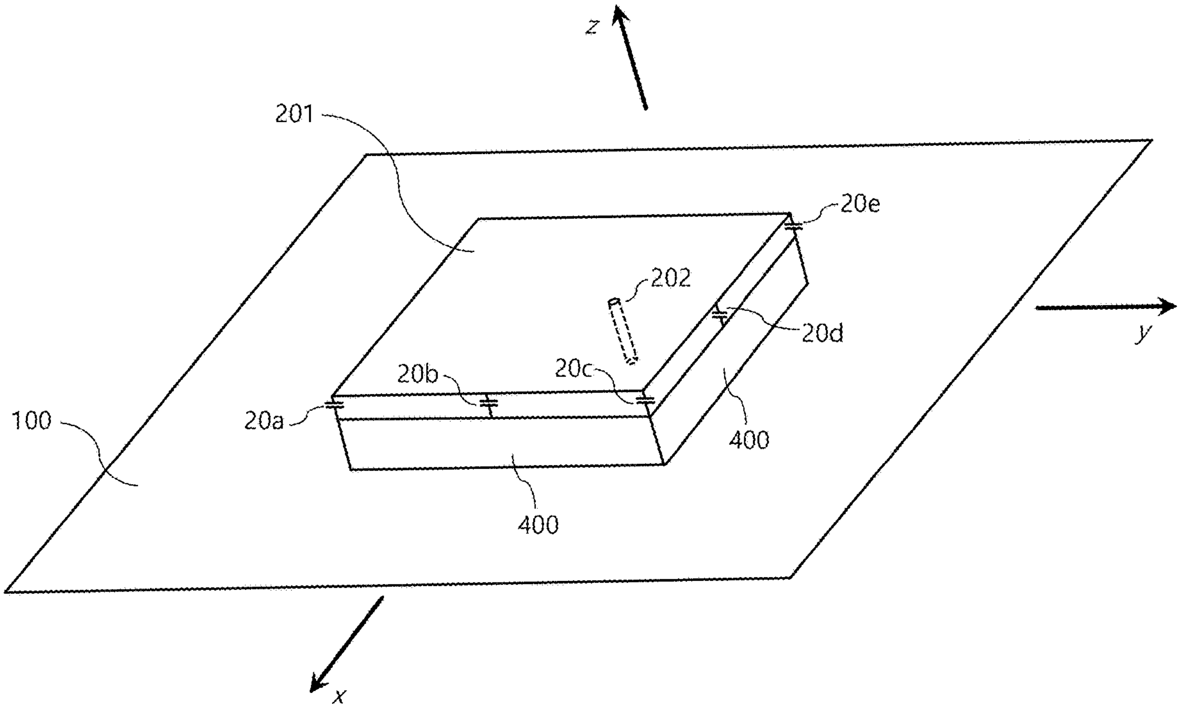
FIG. 4A is a diagram of a second three-dimensional structure of the high-performance GNSS antenna according to embodiment 1 of the present disclosure.
Figure 4B:
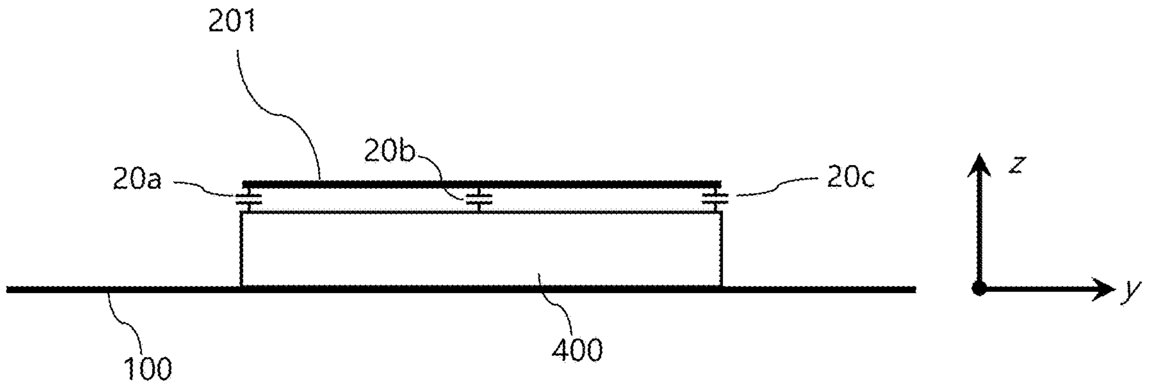
FIG. 4B is a front side view of the high-performance GNSS antenna according to embodiment 1 of the present disclosure.
Figure 4C:
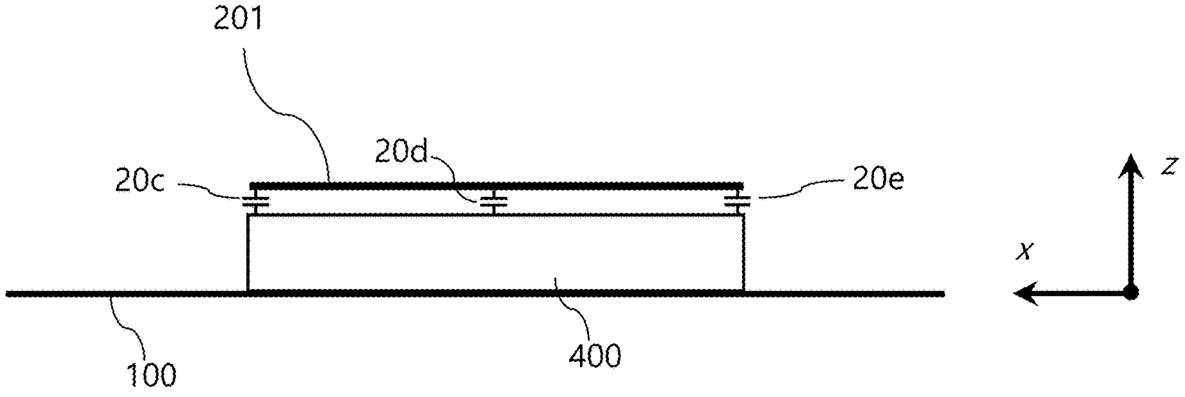
FIG. 4C is a right side view of the high-performance GNSS antenna according to embodiment 1 of the present disclosure.
Figure 4D:
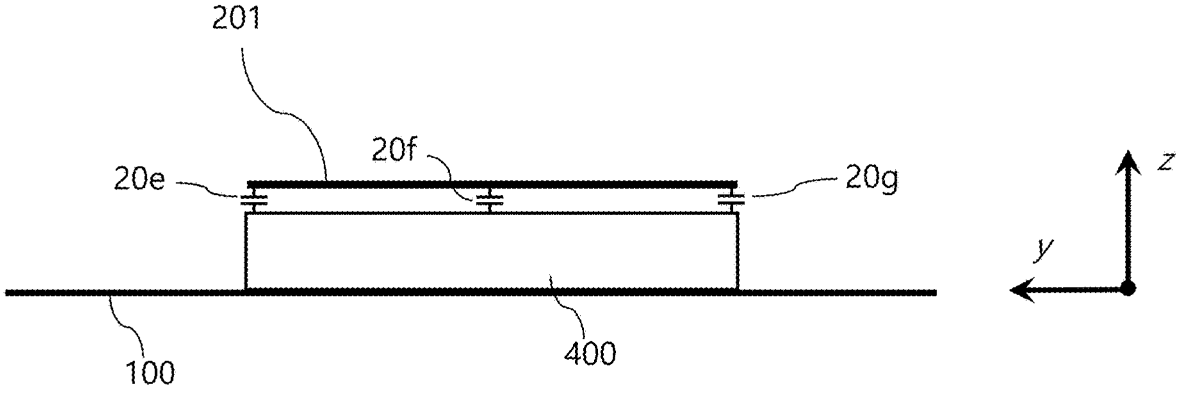
FIG. 4D is a rear side view of the high-performance GNSS antenna according to embodiment 1 of the present disclosure.
Figure 4E:
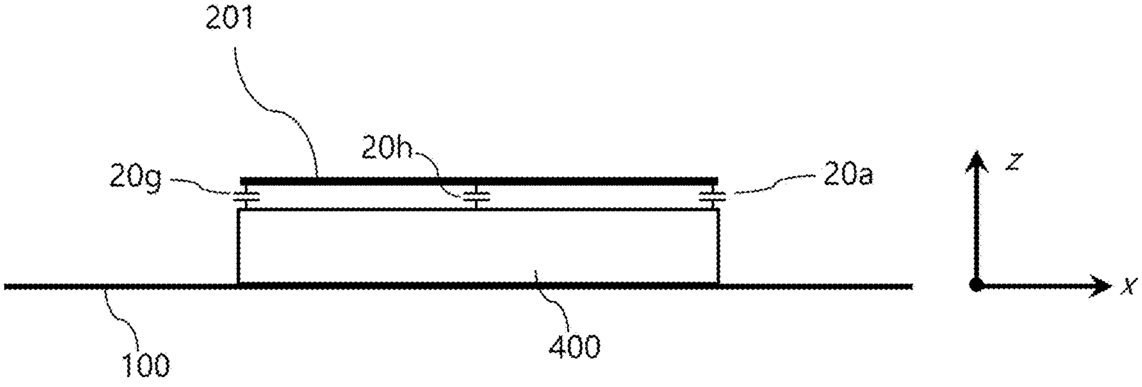
FIG. 4E is a left side view of the high-performance GNSS antenna according to embodiment 1 of the present disclosure.

As shown in FIG. 4A to FIG. 4E, FIG. 4A is a diagram of a second three-dimensional structure of the high-performance GNSS antenna according to embodiment 1 of the present disclosure. FIG. 4B is a front side view of the high-performance GNSS antenna according to embodiment 1 of the present disclosure. FIG. 4C is a right side view of the high-performance GNSS antenna according to embodiment 1 of the present disclosure. FIG. 4D is a rear side view of the high-performance GNSS antenna according to embodiment 1 of the present disclosure. FIG. 4E is a left side view of the high-performance GNSS antenna according to embodiment 1 of the present disclosure.

In some implementations, the connecting conductor may be a metal block 400. A shape of the metal block 400 is designed to adapt to the shape of the patch. A bottom surface of the metal block 400 is electrically connected to the ground plate 100, and corresponding positions at a top surface of the metal block 400 are electrically connected to the first capacitive element 20*a*, the second capacitive element 20*b*, the third capacitive element 20*c*, the fourth capacitive element 20*d*, the fifth capacitive element 20*e*, the sixth capacitive element 20*f*, the seventh capacitive element 20*g*, and the eighth capacitive element 20*h*, respectively.

When the connecting conductor is the metal block, the patch 201, the metal block 400, and the ground plate 100 are sequentially arranged from top to bottom, and the metal block 400 is attached to the ground plate 100, or the metal block 100 is attached to the patch 201.

When the metal block is used, the capacitive element may be connected between the patch and the metal block, as well as between the metal block and the ground plate.

It should be noted that a bottom surface of the metal block 400 is attached to the ground plate 100, which may be in a continuous whole surface attachment to provide maximum conductivity and reduce parasitic effects, or a discontinuous partial attachment to optimize the electric field distribution or simplify the antenna manufacturing process in some applications. In addition, the metal block 400 may be a continuous overall structure to provide a stable and consistent conductive path for the antenna, or composed of several discontinuous metal blocks to flexibly adjust the electric field distribution and meet a specific electromagnetic performance requirement.

As shown in FIG. 4B, with reference to FIG. 4A, the first capacitive element 20*a* is located at a first corner of the rectangular patch 201, the second capacitive element 20*b* is located at a middle position of a first side of the rectangular patch 201, and the third capacitive element 20*c* is located at a second corner of the rectangular patch 201. The first capacitive element 20*a*, the second capacitive element 20*b*, and the third capacitive element 20*c* are configured to electrically connect the rectangular patch 201 and the ground plate 100 through the metal block 400.

As shown in FIG. 4C, with reference to FIG. 4A, the third capacitive element 20*c* is located at a second corner of the rectangular patch 201, the fourth capacitive element 20*d* is located at a middle position of a second side of the rectangular patch 201, and the fifth capacitive element 20*e* is located at a third corner of the rectangular patch 201. The third capacitive element 20*c*, the fourth capacitive element 20*d*, and the fifth capacitive element 20*e* are configured to electrically connect the rectangular patch 201 and the ground plate 100 through the metal block 400.

As shown in FIG. 4D, with reference to FIG. 4A, the fifth capacitive element 20*e* is located at the third corner of the rectangular patch 201, the sixth capacitive element 20*f* is located at a middle position of a third side of the rectangular patch 201, and the seventh capacitive element 20*g* is located at a fourth corner of the rectangular patch 201. The fifth capacitive element 20*e*, the sixth capacitive element 20*f*, and the seventh capacitive element 20*g* are configured to electrically connect the rectangular patch 201 and the ground plate 100 through the metal block 400.

As shown in FIG. 4E, with reference to FIG. 4A, the seventh capacitive element 20*g* is located at the fourth corner of the rectangular patch 201, the eighth capacitive element 20*h* is located at a middle position of a fourth side of the rectangular patch 201, and the first capacitive element 20*a* is located at the first corner of the rectangular patch 201. The seventh capacitive element 20*g*, the eighth capacitive element 20*h*, and the first capacitive element 20*a* are configured to electrically connect the rectangular patch 201 and the ground plate 100 through the metal block 400.

Embodiment 2

A difference from embodiment 1 is that in this embodiment, the patch is a circular patch 601. The first position, the second position, the third position, the fourth position, the fifth position, the sixth position, the seventh position, and the eighth position are a first equal-division point, a second equal-division point, a third equal-division point, a fourth equal-division point, a fifth equal-division point, a sixth equal-division point, a seventh equal-division point, and an eighth equal-division point on a circumference of the circular patch 601, respectively.

Figure 6A:
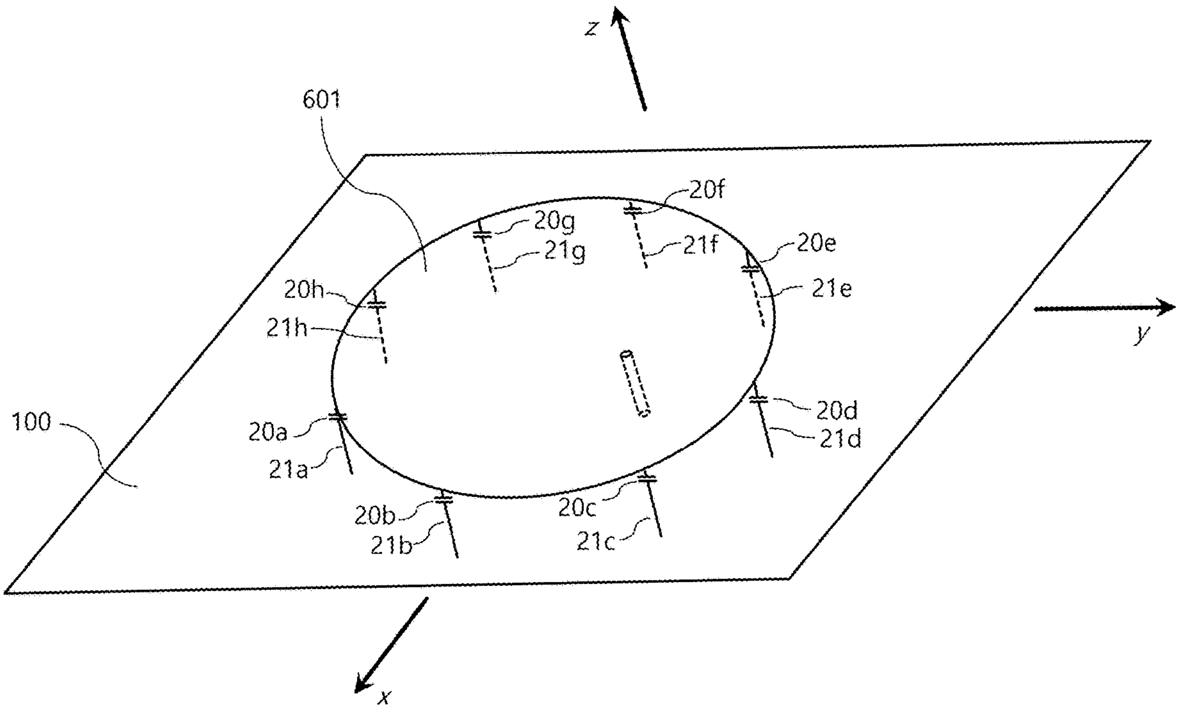
FIG. 6A is a diagram of a structure of a high-performance GNSS antenna according to embodiment 2 of the present disclosure.
Figure 6B:
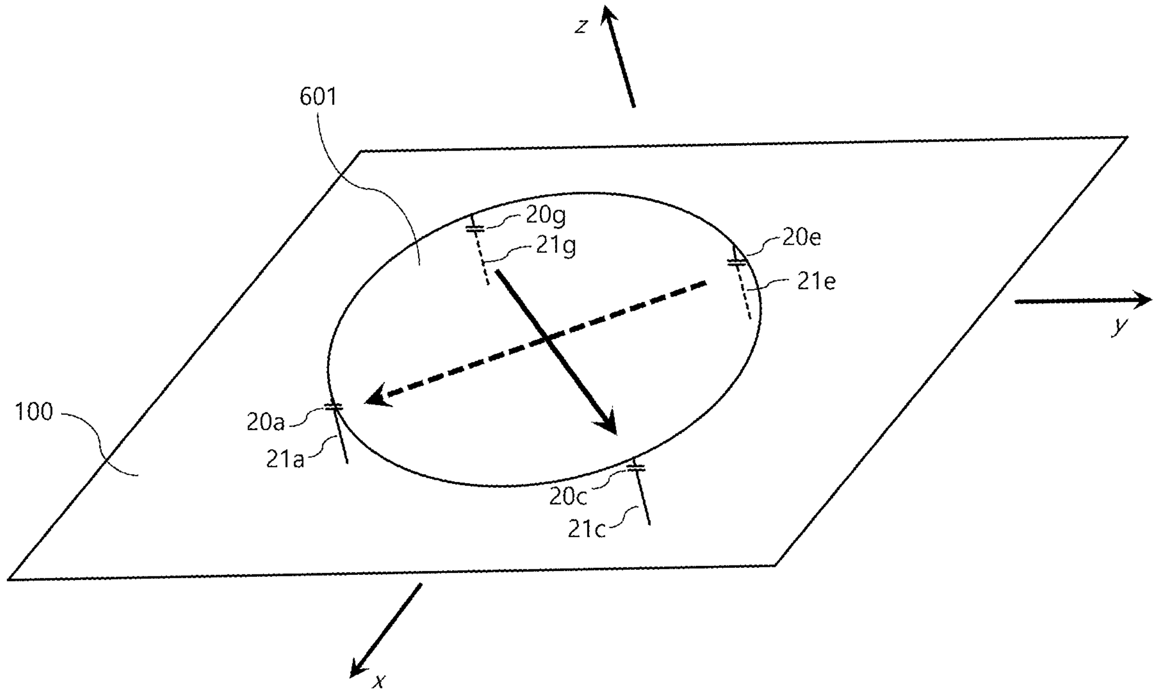
FIG. 6B and FIG. 6C are schematic diagrams of the principle of the high-performance GNSS antenna according to embodiment 2 of the present disclosure.
Figure 6C:
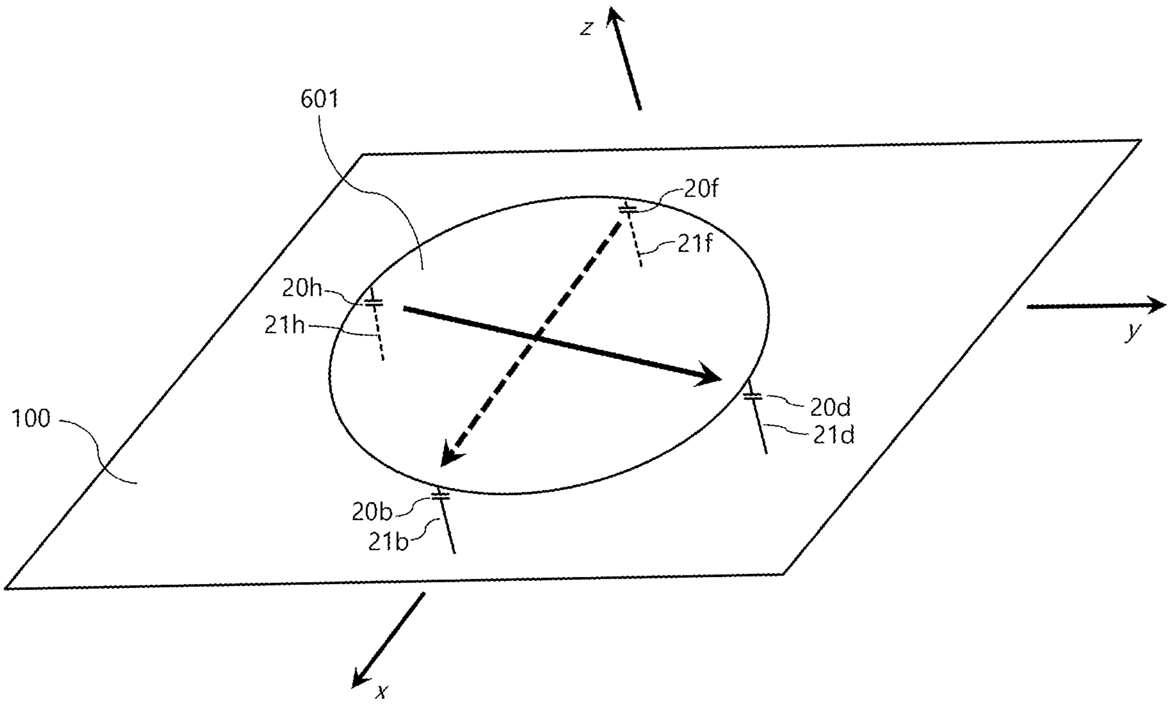

As shown in FIG. 6A to FIG. 6C, FIG. 6A is a diagram of a structure of a high-performance GNSS antenna according to embodiment 2 of the present disclosure, and FIG. 6B and FIG. 6C are schematic diagrams of the principle of the high-performance GNSS antenna according to embodiment 2 of the present disclosure. As a further improvement of the present disclosure, FIG. 6A shows a miniaturized and high-performance GNSS antenna. The circular patch may also generate two (a pair of) orthogonal currents and a circularly polarized signal. As shown in FIG. 6C, and with reference to FIG. 6A, the second capacitive element 20*b* and the sixth capacitive element 20*f* are symmetrically arranged; and the fourth capacitive element 20*d* and the eighth capacitive element 20*h* are symmetrically arranged. The arrangement method ensures that an included angle between the first loop-type current resonator and the third loop-type current resonator is about 80-100 degrees, and an included angle between the second loop-type current resonator and the fourth loop-type current resonator is about 80-100 degrees. In addition, the included angle between any two adjacent loop-type resonators is about 40-50 degrees. Then, a pair of circularly polarized signals may be generated by the cooperative operations of four loop-type current resonators, the aperture efficiency and radiation gain of the antenna are improved by using the principle of electric field superposition, and finally, excellent characteristics of the antenna in miniaturization and high performance are implemented.

For the circular patch 601, the metal connection wire may also be configured to expand the capacitive elements. The metal block 400 may also be configured to expand the capacitive elements. Other connection methods are the same as those in embodiment 1.

When the metal connection wire is used, a connection relationship between the patch, the capacitive element, and the metal connection wire is as follows: one end of the capacitive element at an equal-division point is connected to the circular patch 601, the other end of the capacitive element is connected to the metal connection wire, and a lower end of the metal connection wire is connected to the ground plate 100 to play a role in electrically connecting the capacitive element and the ground plate 100. The metal connection wire is located between the circular patch 601 and the ground plate 100, which may be in the form of a wire, a metal sheet, and the like. The metal connection wire is configured to expand and connect the capacitive elements to achieve an electrical connection between the circular patch 601 and the ground plate 100. The capacitive element is a capacitive load between the circular patch 601 and the ground plate 100, which may effectively reduce an operating frequency of the patch antenna and implement miniaturization of the antenna. Optionally, the metal connection wire is perpendicular to each of the circular patch 601 and the ground plate 100.

When the metal block 400 is used, a connection relationship between the patch, the capacitive element, and the metal block 400 is as follows: one end of the capacitive element at an equal-division point is connected to the circular patch 601, the other end of the capacitive element is connected to the metal block 400, and the metal block 400 is connected to the ground plate 100 to play a role in electrically connecting the capacitive element and the ground plate 100. The metal block 400 is located between the circular patch 601 and the ground plate 100. The metal block 400 is configured to expand and connect the capacitive elements to achieve an electrical connection between the circular patch 601 and the ground plate 100. The capacitive element is a capacitive load between the circular patch 601 and the ground plate 100, which may effectively reduce an operating frequency of the patch antenna and implement miniaturization of the antenna. Optionally, the metal block 400 is perpendicular to each of the circular patch 601 and the ground plate 100.

It should be noted that the patch in the present disclosure may be in various shapes, such as a rectangle, a square, an ellipse, a circle, a ring, and the like. Optionally, the first position, the second position, the third position, the fourth position, the fifth position, the sixth position, the seventh position, and the eighth position are located at a first equal-division point, a second equal-division point, a third equal-division point, a fourth equal-division point, a fifth equal-division point, a sixth equal-division point, a seventh equal-division point, and an eighth equal-division point on a circumference line of the patch, respectively. Optionally, four (two pairs of) orthogonal signals are constructed by connecting eight capacitive elements between the patch and the ground plate, so as to achieve high gain and circularly polarized radiation performance while achieving miniaturization of the antenna.

The GNSS antenna of the present disclosure has the following three features as follows.

(a) A conventional patch antenna (with the size of about 0.5λ×0.5λ, where λ is a wavelength at the central frequency f0) may be reduced to within 0.2λ×0.2λ, without relying on a dielectric substrate made of a polymer material, so that the weight and size of the antenna may be greatly reduced, and the influence of a high-dielectric-constant material on the antenna radiation may be reduced to achieve excellent radiation performance.

(b) With the introduction of the capacitive element, the miniaturized patch antenna may be tuned to any operating frequency band in a larger frequency range without changing the size and structure of the antenna, which greatly saves the manufacturing cost and shortens the research and development cycle.

(c) By establishing four orthogonal signals (or two circularly polarized signals) and leveraging the principle of electric field superposition, the aperture efficiency and radiation gain of the antenna are improved, thereby unifying miniaturization and high-radiation performance of the antenna. Unlike the prior art (such as CN110718750A), which only uses two loop-type current resonators to generate a set of orthogonal current modes, the present disclosure further introduces included angle optimization and symmetry design, so that two sets of orthogonal currents cooperate spatially, and the circularly polarized characteristics and radiation intensity are significantly enhanced. The simulation results show that, as shown in FIG. 8A to FIG. 8D, the antenna of the present disclosure is superior to the prior art in key parameters such as reflection coefficient, axial ratio, radiation pattern, and radiation gain, especially in achieving a gain increase of nearly 3 dB under the same size.

Process Embodiment 1

On the basis of embodiment 1 and embodiment 2, the GNSS antenna further may include a first dielectric substrate 701 and a second dielectric substrate 702. The second dielectric substrate 702 is arranged above the first dielectric substrate 701 in parallel. The first dielectric substrate 701 is used for printing the ground plate 100, and the second dielectric substrate 702 is used for printing the patch. The first capacitive element 20*a*, the second capacitive element 20*b*, the third capacitive element 20*c*, the fourth capacitive element 20*d*, the fifth capacitive element 20*e*, the sixth capacitive element 20*f*, the seventh capacitive element 20*g*, and the eighth capacitive element 20*h* are soldered to corresponding positions of the second dielectric substrate 702 by a surface mounting technology (SMT).

Figure 7A:
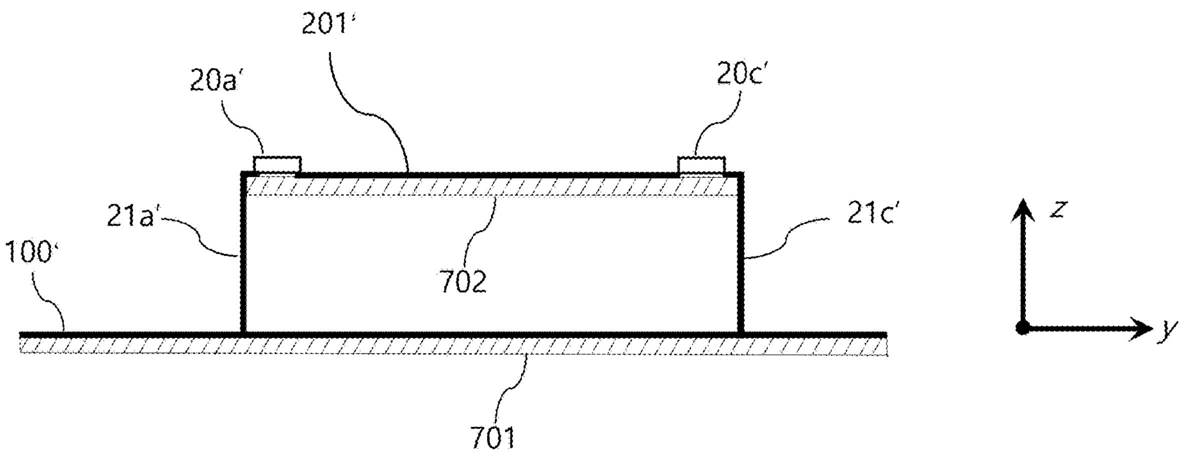
FIG. 7A is a sectional view in a yz plane when the high-performance GNSS antenna according to process embodiment 1 of the present disclosure is mounted in a single-layer PCB.

FIG. 7A is a sectional view in a yz plane when the high-performance GNSS antenna according to process embodiment 1 of the present disclosure is mounted in a single-layer PCB. As shown in FIG. 7A, and with reference to FIG. 2B, a ground plate 100' is printed on an upper side of the first dielectric substrate 701 to form a common single-layer PCB. A rectangular patch 201' is printed on an upper side of the second dielectric substrate 702, and arranged above the single-layer PCB in parallel. A first element 20*a*' is located at a first corner of the rectangular patch 201' and is soldered to the second dielectric substrate 702 by SMT. One end of the first element 20*a*' is connected to the rectangular patch 201', the other end is connected to a first metal connection wire 21*a*'. The first metal connection wire 21*a*' is located between the ground plate 100' and the rectangular patch 201', and perpendicularly arranged; one end of the first metal connection wire 21*a*' is connected to the first element 20*a*', and the other end of the first metal connection wire 21*a*' is connected to the ground plate 100'. The first metal connection wire 21*a*' may be a metal bracket, which is soldered between the first dielectric substrate 701 and the second dielectric substrate 702. Through this connection, the first element 20*a*' electrically connects the ground plate 100' and the rectangular patch 201' at the first corner of the rectangular patch 201', and serves as a capacitive load between the ground plate 100' and the rectangular patch 201' to reduce a resonant frequency of the rectangular patch 201'.

A third element 20*c*' is a chip capacitor, which is located at a second corner of the rectangular patch 201' and soldered to the second dielectric substrate 702 by SMT. One end of the third element 20*c*' is connected to the rectangular patch 201', the other end of the third element 20*c*' is connected to the first metal connection wire 21*c*'. The third metal connection wire 21*c*' is located between the ground plate 100' and the rectangular patch 201', and perpendicularly arranged; one end of the third metal connection wire 21*c*' is connected to the third element 20*c*', and the other end of the third metal connection wire 21*c*' is connected to the ground plate 100'. The third metal connection wire 21*c*' may be a metal bracket, which is soldered between the first dielectric substrate 701 and the second dielectric substrate 702. Through this connection, the third element 20*c*' electrically connects the ground plate 100' and the rectangular patch 201' at the second corner of the rectangular patch 201', and serves a capacitive load between the ground plate 100' and the rectangular patch 201' to reduce the resonant frequency of the rectangular patch 201'.

FIG. 7A only shows the connecting and mounting methods of the capacitive elements at the first corner and the second corner, thereby showing a mounting diagram of the GNSS antenna according to the present disclosure in actual application. A PCB and a metal bracket are configured to maintain the overall structure and support strength of the antenna. The mounting and connecting methods may have the advantages of a simple machining process and low cost. In addition, according to process and design requirements, a lumped capacitive element may also be connected at the middle of the metal connection wire or between the metal connection wire and the ground plate. According to different design requirements or limitations of the manufacturing process, other connection methods may also be adopted, thereby obtaining other embodiments of the present disclosure.

Process Embodiment 2

Figure 7B:
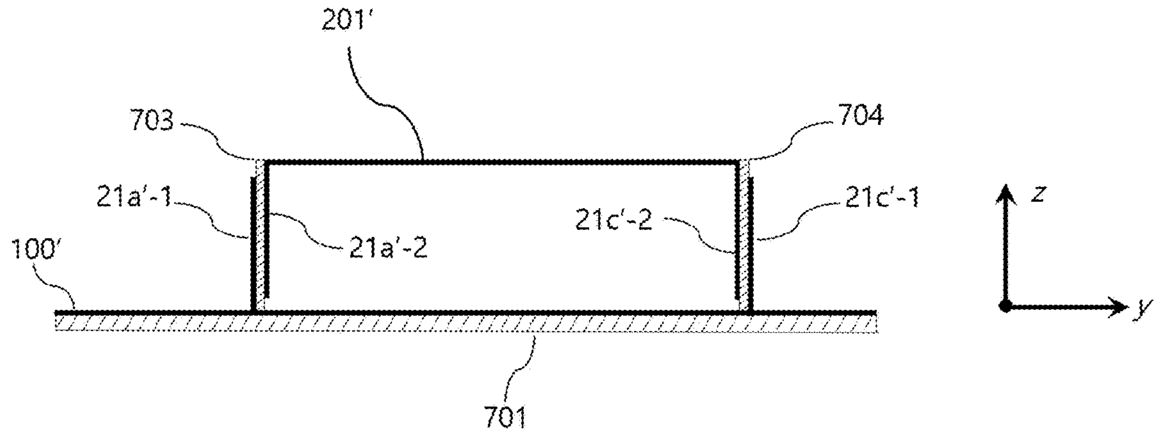
FIG. 7B is a sectional view in a yz plane when the high-performance GNSS antenna according to process embodiment 2 of the present disclosure is mounted in a single-layer PCB.

It should be noted that, in another optional embodiment, as shown in FIG. 7B, FIG. 7B is a sectional view in a yz plane when the high-performance GNSS antenna according to process embodiment 2 of the present disclosure is mounted in a single-layer PCB. With reference to FIG. 2B, the ground plate 100' is printed on the upper side of the first dielectric substrate 701 to form a typical single-layer PCB. The rectangular patch 201' is arranged above the single-layer PCB in parallel. A metal connection wire 21*a*'-1 extends downward from the first corner of the rectangular patch 201', and a metal connection wire 21*a*'-2 extends upward from the ground plate 100'. A third dielectric substrate 703 is arranged between the metal connection wire 21*a*'-1 and the metal connection wire 21*a*'-2 in parallel to form a distributed capacitive element. Similarly, a metal connection wire 21*c*'-1 extends downward from the second corner of the rectangular patch 201', and a metal connection wire 21*c*'-2 extends upward from the ground plate 100'. A fourth dielectric substrate 704 is arranged between the metal connection wire 21*c*'-1 and the metal connection wire 21*c*'-2, at a middle position of the metal connection wire in parallel, to form a distributed capacitive element, which is equivalent to that the capacitive element is connected to the middle of the metal connection wire. Through this connection, a distributed capacitive load is constructed between the ground plate 100' and the rectangular patch 201' to reduce the resonant frequency of the rectangular patch 201'. According to process and design requirements, the distributed capacitive element may also be connected between the patch and the metal connection wire or between the metal connection wire and the ground plate.

FIG. 8A to FIG. 8D show the simulation performance of a miniaturized and circularly polarized patch antenna according to an embodiment of the present disclosure, which is used to verify the effectiveness and technical effect of the antenna structure.

Figure 8A:
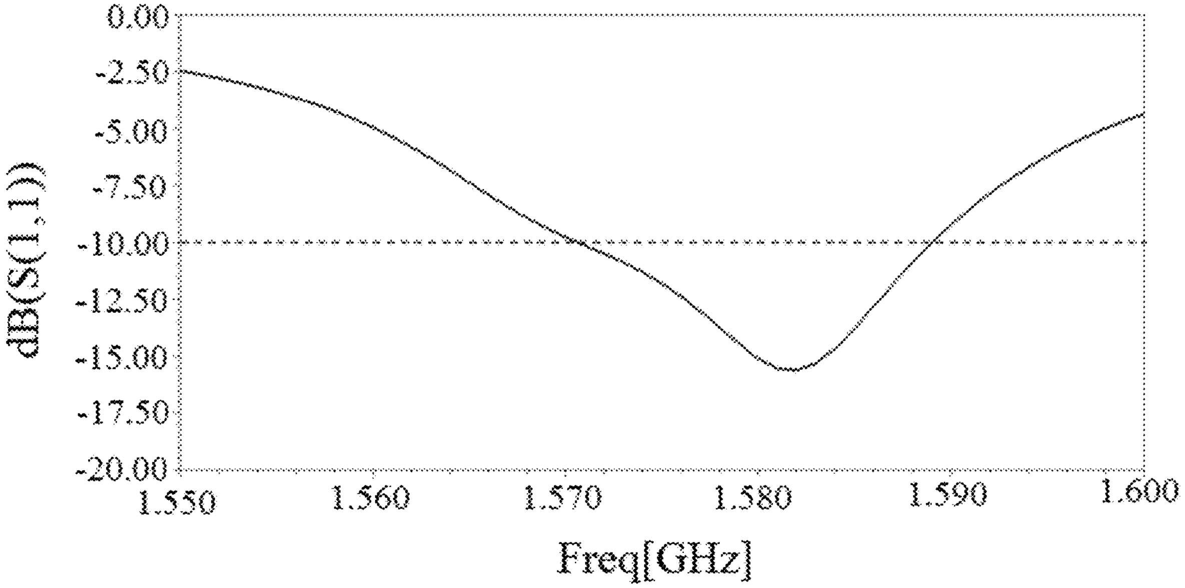
FIG. 8A is a reflection coefficient of the high-performance GNSS antenna according to an embodiment of the present disclosure in simulation.
Figure 8B:
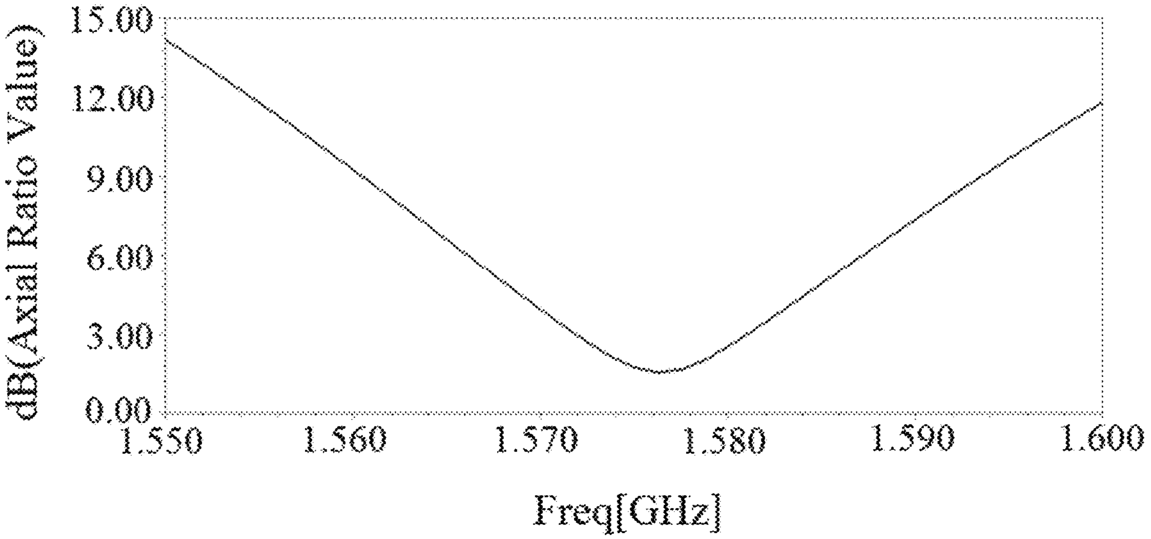
FIG. 8B is a diagram of an axial ratio of the high-performance GNSS antenna according to an embodiment of the present disclosure in simulation.

FIG. 8A and FIG. 8B are curve diagrams of a reflection coefficient and an axial ratio of the high-performance GNSS antenna according to an embodiment 1 of the present disclosure, respectively. In the embodiment, a size of the antenna is 30 mm×30 mm×4 mm, and a size of the ground plate is 50 mm×50 mm. The simulation results show that the designed antenna has good impedance matching characteristics, and its operating frequency band may completely cover L1 frequency band (with the central frequency of 1.575 GHz), and the axial ratio is less than 3 dB in the operating frequency band, which meets the performance requirements of circularly polarized antenna. Compared with the ceramic GPS patch antenna with the same size on the market, the impedance bandwidth and axial ratio bandwidth of the antenna of the present disclosure are improved by about 30%, which shows that it has obvious advantages in gain stability and polarization purity.

Figure 8C:
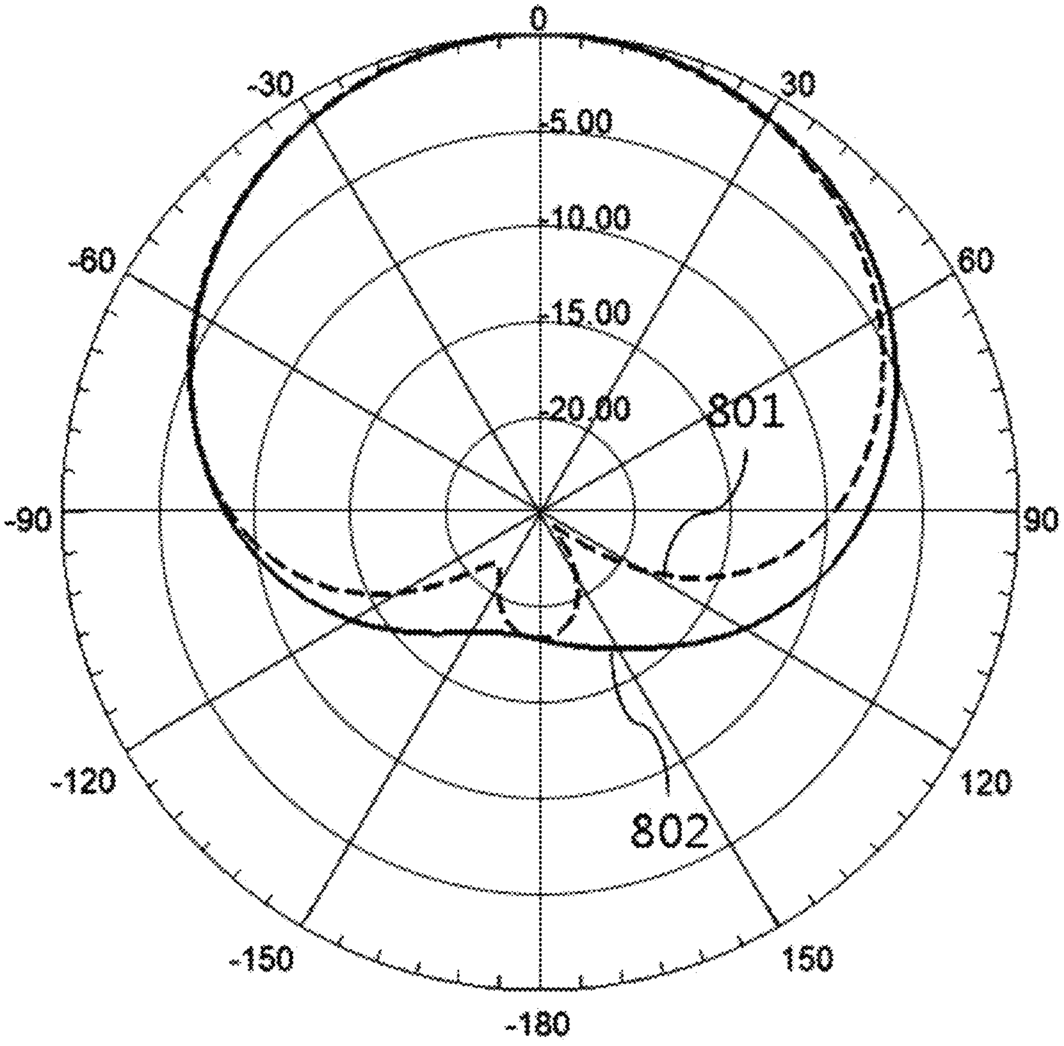
FIG. 8C is a 2D radiation pattern of the high-performance GNSS antenna according to an embodiment of the present disclosure in simulation.
Figure 8D:
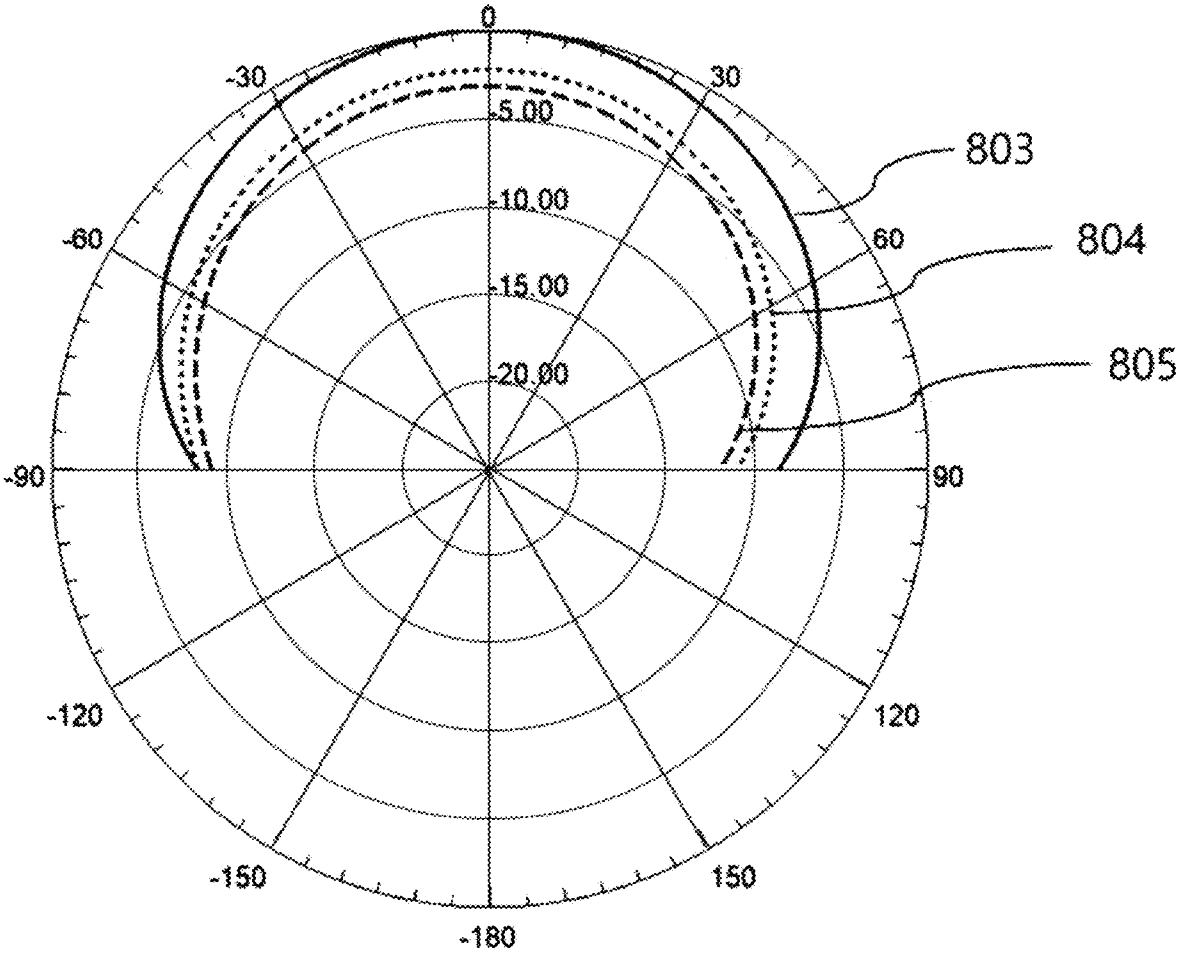
FIG. 8D is a comparison pattern of the normalized simulated gain of the antennas of the present disclosure under different structural conditions.

FIG. 8C is a 2D radiation pattern of a miniaturized and high-performance GNSS antenna according to an embodiment 1 of the present disclosure. A curve 801 and a curve 802 are normalized radiation patterns of an xz plane and a yz plane, respectively. It may be seen that, at the frequency of 1.575 GHz, the antenna has good normal radiation ability and wide beam characteristics, and its main lobe gain may reach more than 7 dB, which is suitable for GNSS application scenarios requiring wide coverage and high positioning accuracy FIG. 8D is a comparison diagram of normalized simulated gain of the antenna of the present disclosure under different structural conditions. A curve 803 shows the simulation gain result when the loop-type current resonator structure with four included angles is optimized in the embodiment of the present disclosure; a curve 805 shows the comparison result, that is, the result of the traditional solution using only two loop-type current resonators (the first and third resonators); a curve 804 shows another set of comparison data, that is, the result obtained by using the structure with four loop-type current resonators of which the arrangement does not meet the included angle requirement of the present disclosure (the included angle is only 20 degrees). By comparison, it may be seen that the radiation gain of a curve 803 is significantly higher than that of the curve 805 in the whole main beam range, and the overall improvement is nearly 3 dB, indicating that the optimized four resonator structure significantly enhances the electric field superposition effect and circularly polarized ability. However, the curve 804 and the curve 805 basically coincide, which shows that only increasing the number of resonators without optimizing the arrangement may not effectively improve the performance of the antenna.

The above simulation results fully verify the uniqueness and effectiveness of the structure of the present disclosure: four loop-type current resonators need to be arranged in a cross way with a specific included angle (Optionally 40-50 degrees) to form two groups of orthogonal current modes, which are spatially superimposed in coordination, so as to improve the aperture efficiency and radiation gain of the antenna. In addition, the simulation also shows that the four crossed loop-type current resonator structures in the present disclosure may excite a more uniform and widely distributed current mode on the surface of the patch, which significantly improves the effective radiation area of the patch. Compared with the traditional structure with only two loop-type current resonators, its current distribution is often concentrated in local areas, and there is an excitation blind area, which leads to limited radiation directivity and low aperture efficiency. By optimizing the arrangement angle and current path, the structure of the present disclosure may make the four loop-type current resonators excite cooperatively in space, so as to realize the full expansion of electromagnetic energy on the surface of the patch and improve the overall radiation efficiency and the consistency of polarization field strength. This mechanism further explains the gain increase shown in FIG. 8D and verifies the advantages of the structure of the present disclosure in realizing high-performance circularly polarized radiation under the condition of limited size.

Various embodiments of the disclosure may have one or more of the following effects. In some embodiments, the discourse may provide a GNSS antenna which may help to solve one or more problems in prior art existing patch antenna which may be limited in antenna frequency tunability, large in weight, and low in gain. In other embodiments, miniaturization and adjustability of the antenna may be implemented. With the introduction of capacitive elements, the miniaturized patch antenna may be tuned to any operating frequency band in a larger frequency range without changing the size and structure of the antenna, which greatly saves manufacturing cost and shortens the research and development cycle. In further embodiments, four loop-type current resonators may be established to generate a pair of circularly polarized signals. Enhancement of the circularly polarized signals may be achieved by using the principle of electric field superposition, which may help to greatly improve antenna gain and radiation efficiency, and achieve unification of miniaturization and high radiation performance of the antenna.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A GNSS (Global Navigation Satellite System) antenna, comprising:

a patch;

a first capacitive element, a second capacitive element, a third capacitive element, a fourth capacitive element, a fifth capacitive element, a sixth capacitive element, a seventh capacitive element, an eighth capacitive element;

a connecting conductor; and a ground plate, arranged below the patch;

wherein:

the connecting conductor is configured to expand and connect the capacitive elements to achieve an electrical connection between the patch and the ground plate;

the patch, the first capacitive element, the fifth capacitive element, the connecting conductor, and the ground plate are electrically connected to form a first loop-type current resonator;

the patch, the second capacitive element, the sixth capacitive element, the connecting conductor, and the ground plate are electrically connected to form a second loop-type current resonator;

the patch, the third capacitive element, the seventh capacitive element, the connecting conductor, and the ground plate are electrically connected to form a third loop-type current resonator;

the patch, the fourth capacitive element, the eighth capacitive element, the connecting conductor, and the ground plate are electrically connected to form a fourth loop-type current resonator;

the first loop-type current resonator, the second loop-type current resonator, the third loop-type current resonator, and the fourth loop-type current resonator are arranged crosswise in turn; and an included angle between any two adjacent loop-type current resonators is 40-50 degrees, wherein the first loop-type current resonator and the third loop-type current resonator are orthogonal to each other, and the second loop-type current resonator and the fourth loop-type current resonator are orthogonal to each other, so as to enhance circularly polarized signals.

2. The GNSS antenna according to claim 1, wherein the GNSS antenna further comprises a feed line configured to feed an RF signal.

3. The GNSS antenna according to claim 1, wherein:

the patch is a rectangular patch;

the first capacitive element, the second capacitive element, the third capacitive element, the fourth capacitive element, the fifth capacitive element, the sixth capacitive element, the seventh capacitive element, and the eighth capacitive element are electrically connected to a first position, a second position, a third position, a fourth position, a fifth position, a sixth position, a seventh position, and an eighth position of sides of the patch, respectively;

the first position, the third position, the fifth position, and the seventh position are a first corner, a second corner, a third corner, and a fourth corner of the rectangular patch, respectively; and the second position, the fourth position, the sixth position, and the eighth position are a first midpoint between the first corner and the second corner, a second midpoint between the second corner and the third corner, a third midpoint between the third corner and the fourth corner, and a fourth midpoint between the fourth corner and the first corner, respectively.

4. The GNSS antenna according to claim 1, wherein:

the patch is an elliptical patch, a circular patch, or a ring patch;

the first capacitive element, the second capacitive element, the third capacitive element, the fourth capacitive element, the fifth capacitive element, the sixth capacitive element, the seventh capacitive element, and the eighth capacitive element are electrically connected to a first position, a second position, a third position, a fourth position, a fifth position, a sixth position, a seventh position, and an eighth position of sides of the patch, respectively; and the first position, the second position, the third position, the fourth position, the fifth position, the sixth position, the seventh position, and the eighth position are a first equal-division point, a second equal-division point, a third equal-division point, a fourth equal-division point, a fifth equal-division point, a sixth equal-division point, a seventh equal-division point, and an eighth equal-division point on a circumference of the patch, respectively.

5. The GNSS antenna according to claim 1, wherein:

the connecting conductor includes: a first metal connection wire, a second metal connection wire, a third metal connection wire, a fourth metal connection wire, a fifth metal connection wire, a sixth metal connection wire, a seventh metal connection wire, and an eighth metal connection wire; and the first metal connection wire, the second metal connection wire, the third metal connection wire, the fourth metal connection wire, the fifth metal connection wire, the sixth metal connection wire, the seventh metal connection wire, and the eighth metal connection wire are electrically connected to the first capacitive element, the second capacitive element, the third capacitive element, the fourth capacitive element, the fifth capacitive element, the sixth capacitive element, the seventh capacitive element, and the eight capacitive element, respectively.

6. The GNSS antenna according to claim 1, wherein the connecting conductor is a metal block, which is an integral structure or comprises a plurality of dispersed metal blocks, for adjusting a conductive path or an electric field distribution.

7. The GNSS antenna according to claim 5, wherein:

the patch is arranged above the ground plate in parallel; and the first metal connection wire, the second metal connection wire, the third metal connection wire, the fourth metal connection wire, the fifth metal connection wire, the sixth metal connection wire, the seventh metal connection wire, and the eighth metal connection wire are perpendicularly arranged between the patch and the ground plate, respectively.

8. The GNSS antenna according to claim 6, wherein:

the patch, the metal block, and the ground plate are arranged from top to bottom; and the metal block is located between the patch and the ground plate.

9. The GNSS antenna according to claim 1, wherein:

the first capacitive element and the fifth capacitive element are symmetrically arranged;

the second capacitive element and the sixth capacitive element are symmetrically arranged;

the third capacitive element and the seventh capacitive element are symmetrically arranged; and the fourth capacitive element and the eighth capacitive element are symmetrically arranged.

10. The GNSS antenna according to claim 1, wherein each of the first capacitive element, the second capacitive element, the third capacitive element, the fourth capacitive element, the fifth capacitive element, the sixth capacitive element, the seventh capacitive element, and the eighth capacitive element each are one or more of a lumped capacitive element, a distributed capacitive element, and a combined capacitive element.

11. The GNSS antenna according to claim 2, wherein:

the feed line is a probe feed, a coaxial feed line, or a coupling feed, and a number of the feed lines is one, two, or four.

12. The GNSS antenna according to claim 8, wherein:

the metal block is attached to the ground plate; or the metal block is attached to the patch.

* * * * *